United States Patent [19]
Mitsutani

[11] Patent Number: 5,822,982
[45] Date of Patent: Oct. 20, 1998

[54] DEVICE FOR DETERMINING DETERIORATION OF A CATALYTIC CONVERTER FOR AN ENGINE

[75] Inventor: Noritake Mitsutani, Toyota, Japan

[73] Assignee: Toyota Jidosha Kabushiki Kaisha, Toyota, Japan

[21] Appl. No.: 685,100

[22] Filed: Jul. 22, 1996

[30] Foreign Application Priority Data

Jul. 26, 1995 [JP] Japan .................................. 7-190573

[51] Int. Cl.⁶ .......................................... F01N 3/20
[52] U.S. Cl. .............................. 60/276; 60/277; 73/118.1
[58] Field of Search ........................... 60/274, 276, 277, 60/285; 73/118.1

[56] References Cited

U.S. PATENT DOCUMENTS

| 5,279,115 | 1/1994 | Inoue et al. | 60/276 |
| 5,282,383 | 2/1994 | Kayanuma | 73/118.1 |
| 5,301,501 | 4/1994 | Shimizu et al. | 60/274 |
| 5,341,642 | 8/1994 | Kurihara et al. | 60/277 |
| 5,357,750 | 10/1994 | Ito et al. | 60/274 |
| 5,359,853 | 11/1994 | Shimizu | 60/277 |
| 5,414,996 | 5/1995 | Sawada et al. | 60/277 |
| 5,448,886 | 9/1995 | Toyoda | 60/277 |
| 5,640,847 | 6/1997 | Nakajima et al. | 60/277 |

FOREIGN PATENT DOCUMENTS

| 43-22-341-A | 1/1994 | Germany . |
| A-2-033408 | 2/1990 | Japan . |
| A-5-118212 | 5/1993 | Japan . |
| A-5-149128 | 6/1993 | Japan . |
| A-5-209510 | 8/1993 | Japan . |
| A-6-17640 | 1/1994 | Japan . |
| A-6-159048 | 6/1994 | Japan . |

Primary Examiner—Willis R. Wolfe
Attorney, Agent, or Firm—Oliff & Berridge, PLC

[57] ABSTRACT

The device according to the present invention controls air-fuel ratio of the exhaust gas flowing into the catalytic converter in such a manner that the exhaust gas flowing into the catalytic converter fluctuates around a center value on the lean air-fuel ratio side compared to the stoichiometric air-fuel ratio when it performs the determination of deterioration of the catalytic converter. In this condition, the device calculates the rich gas inflow amount which is the amount of HC and CO in the exhaust gas flowing into the catalytic converter and the rich gas outflow amount which is the amount of HC and CO in the exhaust gas flowing out from the catalytic converter. The device, then, determines the degree of deterioration of the catalytic converter based on the calculated values of the rich gas inflow amount and the rich gas outflow amount. Since the difference between the rich gas inflow amount and the rich gas outflow amount represents the amount of HC and CO oxidized by the catalytic converter, the deterioration of the catalytic converter can be determined accurately by comparing the rich gas inflow amount and the rich gas outflow amount.

10 Claims, 15 Drawing Sheets

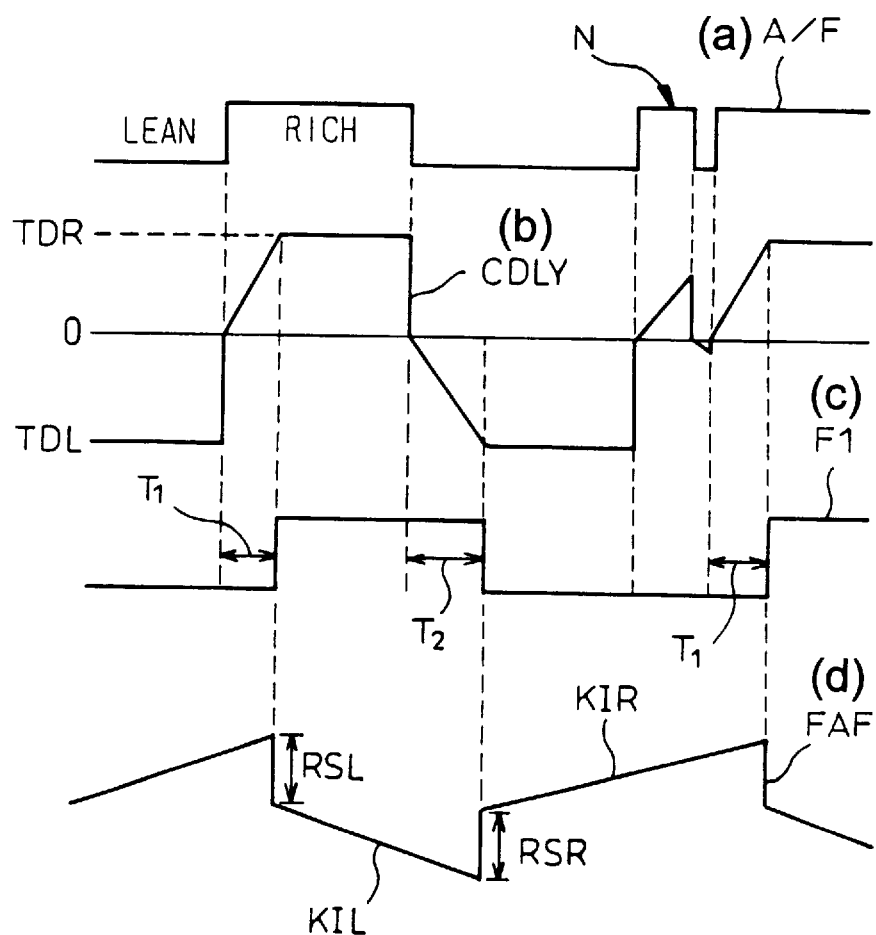

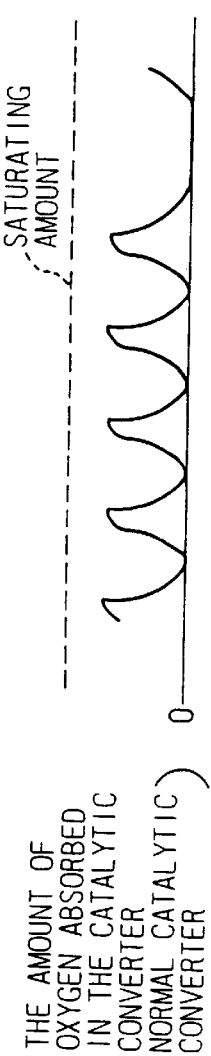
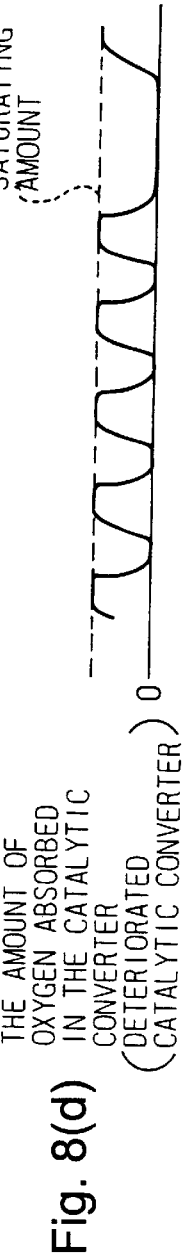
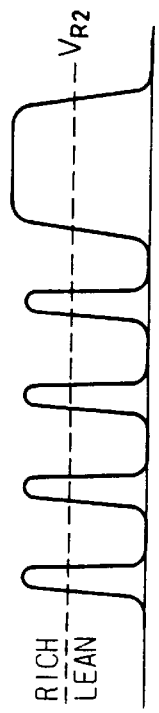
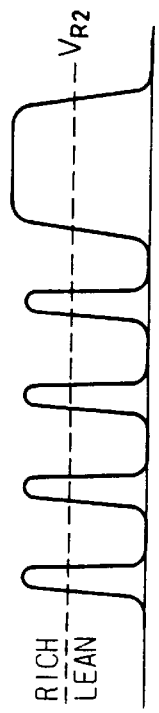
Fig. 8(a) VOM
Fig. 8(b) THE AMOUNT OF OXYGEN ABSORBED IN THE CATALYTIC CONVERTER (NORMAL CATALYTIC CONVERTER)
Fig. 8(c) VOS (NORMAL CATALYTIC CONVERTER)
Fig. 8(d) THE AMOUNT OF OXYGEN ABSORBED IN THE CATALYTIC CONVERTER (DETERIORATED CATALYTIC CONVERTER)
Fig. 8(e) VOS (DETERIORATED CATALYTIC CONVERTER)

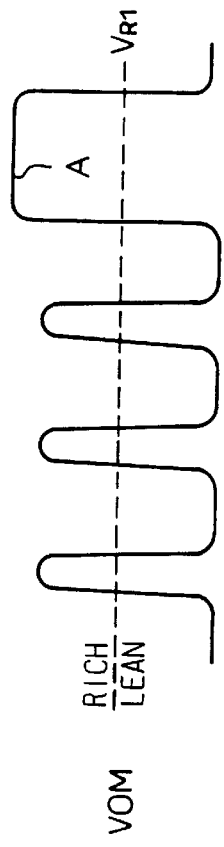
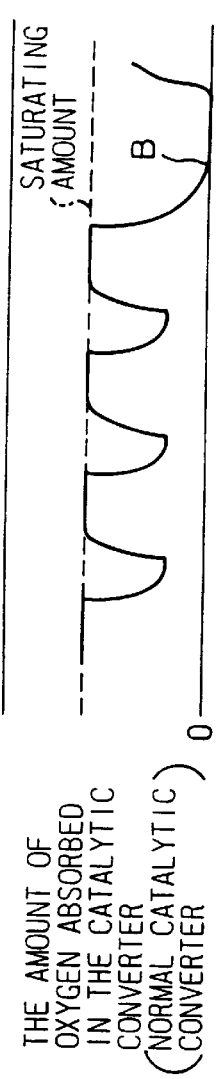
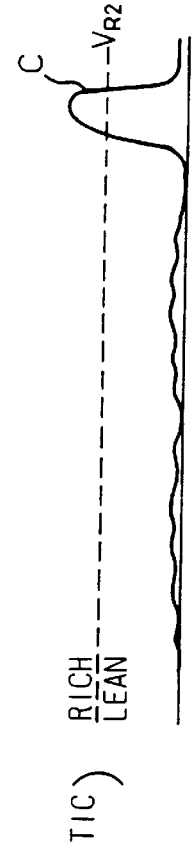
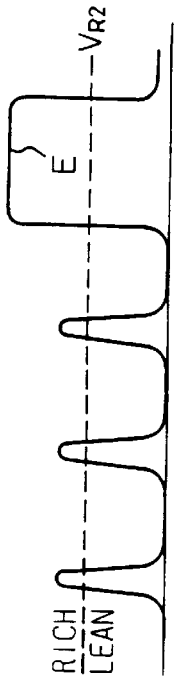
Fig. 9(a) VOM
Fig. 9(b) THE AMOUNT OF OXYGEN ABSORBED IN THE CATALYTIC CONVERTER (NORMAL CATALYTIC CONVERTER)
Fig. 9(c) VOS (NORMAL CATALYTIC CONVERTER)
Fig. 9(d) THE AMOUNT OF OXYGEN ABSORBED IN THE CATALYTIC CONVERTER (DETERIORATED CATALYTIC CONVERTER)
Fig. 9(e) VOS (DETERIORATED CATALYTIC CONVERTER)

DEVICE FOR DETERMINING DETERIORATION OF A CATALYTIC CONVERTER FOR AN ENGINE

BACKGROUND OF THE INVENTION

1. Field of the Invention

The present invention relates to a device for determining deterioration of a catalytic converter for an engine. More specifically, the present invention relates to a device which controls the air-fuel ratio of the engine in such a manner that the air-fuel ratio of the exhaust gas flowing into the catalytic converter changes between lean and rich compared to the stoichiometric air-fuel ratio alternately and detects deterioration of the catalytic converter based the outputs of air-fuel ratio sensors disposed in the exhaust gas passage upstream and downstream of the catalytic converter.

2. Description of the Related Art

A method for determining deterioration of a catalytic converter based on the output signals of air-fuel ratio sensors disposed in an exhaust gas upstream and downstream of a catalytic converter of an engine is known. In this method, usually, deterioration of the catalytic converter is determined based on at least the output signal of the downstream air-fuel ratio sensor when the air-fuel ratio of the exhaust gas flowing into the catalytic converter is feedback controlled to a stoichiometric mixture based on at least the output of the upstream air-fuel ratio sensor.

A three-way catalytic converter usually has an $O_2$ storage capability, i.e., a capability for absorbing oxygen in the exhaust gas when the air-fuel ratio of the exhaust gas flowing into the catalytic converter is lean compared to the stoichiometric air-fuel ratio and for releasing the absorbed oxygen when the air-fuel ratio of the exhaust gas flowing into the catalytic converter is rich compared to the stoichiometric air-fuel ratio. Due to this $O_2$ storage capability, the air-fuel ratio of the exhaust gas flowing out from the catalytic converter is kept near the stoichiometric air-fuel ratio even when the air-fuel ratio of the exhaust gas flowing into the catalytic converter fluctuates between a rich air-fuel ratio and a lean air-fuel ratio in a relatively short cycle period. Therefore, if the catalytic converter has not deteriorated, the fluctuation of the air-fuel ratio of the exhaust gas upstream of the catalytic converter is smoothed by the catalytic converter and, thereby, the air-fuel ratio of the exhaust gas downstream of the catalytic converter fluctuates with a relatively small amplitude and at a relatively low frequency.

However, the $O_2$ storage capability of the catalytic converter decreases as the degree of deterioration of the catalytic converter becomes large, and the amount of oxygen absorbed and released by the catalytic converter becomes small when the catalytic converter has deteriorated. Therefore, if the catalytic converter has deteriorated, the air-fuel ratio of the exhaust gas downstream of the catalytic converter fluctuates in the manner similar to that of the air-fuel ratio of the exhaust gas upstream of the catalytic converter, i.e., when the catalytic converter has deteriorated, the amplitude of the fluctuation of the air-fuel ratio of exhaust gas downstream of the catalytic converter becomes larger, and the frequency thereof becomes higher. The conventional method utilizes this phenomena for determining the deterioration of the catalytic converter. Namely, in the conventional method, it is determined that the catalytic converter has deteriorated when the cycle period of the fluctuation of the output of the downstream air-fuel ratio sensor becomes shorter (or the frequency of the changes of the output of the downstream air-fuel ratio sensor between a rich air-fuel ratio output and a lean air-fuel ratio output becomes higher).

An example of the device which determines deterioration of the catalytic converter based on the frequency of the reversal of the output of the downstream air-fuel ratio sensor (i.e., the frequency of the changes of the output of the downstream air-fuel ratio sensor from rich to lean or vice versa) is disclosed in Japanese Unexamined Patent Publication (Kokai) No. 5-118212.

The device in the '212 publication monitors the frequency of the reversal of the output of the downstream air-fuel ratio sensor when the air-fuel ratio of the engine is feedback controlled based on the output of the upstream air-fuel ratio sensor in such a manner that the air-fuel ratio of the engine fluctuates regularly around the stoichiometric air-fuel ratio. When the frequency of the reversal of the output of the downstream air-fuel ratio sensor is high, the device controls the air-fuel ratio of the engine so that the center value of air-fuel ratio fluctuation shifts from the stoichiometric air-fuel ratio to a lean air-fuel ratio side or a rich air-fuel ratio side compared to the stoichiometric air-fuel ratio, and monitors the frequency of the reversal of the output of the downstream air-fuel ratio sensor again. If the frequency of the reversal in this condition is still high, the device determines that the catalytic converter has deteriorated.

If the deterioration of the catalytic converter is determined based on the frequency of the reversal of the output of the downstream air-fuel ratio, a normal catalytic converter may be incorrectly determined as being deteriorated when the air-fuel ratio of the engine is controlled within a narrow range around the stoichiometric air-fuel ratio. When the catalytic converter has deteriorated, the amplitude of the output of the downstream air-fuel ratio sensor becomes large, and the output of the downstream air-fuel ratio sensor tends to cross the value corresponding to the stoichiometric air-fuel ratio during the fluctuation, i.e., the number of the reversals of the output may increase. However, if the air-fuel ratio is controlled within a narrow range around the stoichiometric air-fuel ratio, the output of the air-fuel ratio sensor tends to cross the value corresponding to the stoichiometric air-fuel ratio during the fluctuation and the frequency of the reversal of the output may increase even when the amplitude of the fluctuation is small. Therefore, when the air-fuel ratio fluctuates within a narrow range around the stoichiometric air-fuel ratio, the catalytic converter may be determined as being deteriorated even though the amplitude of the fluctuation of the downstream air-fuel ratio sensor is small. This may cause an incorrect determination in which a slightly deteriorated catalytic converter is determined as being deteriorated.

The device in the '212 publication prevents this incorrect determination by shifting the center of fluctuation of the air-fuel ratio to a lean side or rich side by a predetermined amount when determining the deterioration of the catalytic converter. By shifting the center of fluctuation of the air-fuel ratio, the air-fuel ratio of the engine fluctuates around a center value remote from the stoichiometric. Therefore, the output of the downstream air-fuel ratio sensor crosses the stoichiometric air-fuel ratio only when the fluctuation is large, and the frequency of the reversal of the output of the downstream air-fuel ratio sensor increases only when the amplitude of the fluctuation of the output becomes large. This eliminates the possibility that a slightly deteriorated catalytic converter is determined as being deteriorated.

However, it is found that, when the deterioration of the catalytic converter is determined based on the frequency of the reversal of the output of the downstream air-fuel ratio sensor, an incorrect determination may occur even if the center of the fluctuation of the air-fuel ratio is shifted from the stoichiometric air-fuel ratio.

For example, the cycle period of the air-fuel ratio feedback control is affected largely by the response of the upstream and downstream air-fuel ratio sensors. When the response of the air-fuel ratio sensor is low, the cycle period of the air-fuel ratio feedback control becomes long and, thereby the cycle period of the fluctuation of the air-fuel ratio becomes long. When the cycle period of the fluctuation becomes long, a "rich period" of the air-fuel ratio fluctuation in which the air-fuel ratio of the exhaust gas stays on a rich air-fuel ratio side compared to the stoichiometric air-fuel ratio also becomes long. When the rich period of the air-fuel ratio fluctuation is long, the catalytic converter, even if it is not deteriorated, releases all the absorbed oxygen before the rich period ends. If the rich period continues even after the catalytic converter has released all of the oxygen, since the catalytic converter cannot release oxygen any more, the air-fuel ratio of the exhaust gas flowing out from the catalytic converter fluctuates to a rich air-fuel ratio side. In this case, the air-fuel ratio of the exhaust gas downstream of the catalytic converter fluctuates in the same manner as that of the exhaust gas upstream of the catalytic converter, and the amplitude and the frequency of the reversals of the output of the downstream air-fuel ratio sensor increases. Therefore, if the deterioration of the catalytic converter is determined based on the frequency of the reversal of the output of the downstream air-fuel ratio sensor, a normal catalytic converter may incorrectly determined as being deteriorated in this case.

On the contrary, if the cycle period of the air-fuel ratio feedback control becomes short, the cycle period of the fluctuation becomes short and the rich period also becomes short. When the rich period is short, the amount of oxygen released from the catalytic converter becomes small, thus, even a deteriorated catalytic converter (which can store only small amount of oxygen) does not release all of the absorbed (stored) oxygen. Therefore, in this case, the air-fuel ratio of the exhaust gas downstream of the catalytic converter does not fluctuate even if the catalytic converter has deteriorated. Namely, when the cycle period of the air-fuel ratio feedback control is short, the frequency of the reversal of the output of the downstream air-fuel ratio sensor becomes low even if the catalytic converter has deteriorated, and an incorrect determination in which a deteriorated catalytic converter is determined as being normal may occur.

Further, the amount of oxygen released from the catalytic converter in a unit time becomes larger as the concentration of the HC and CO components in the exhaust gas becomes higher. Therefore, when the concentration of the HC and CO components is high (i.e., when the "degree of richness" of the exhaust gas is high), the catalytic converter releases all the absorbed oxygen before the end of the rich period even if the rich period is relatively short and even if the catalytic converter has not deteriorated. Thus, when the degree of richness of the exhaust gas is high, a normal catalytic converter may be incorrectly determined as being deteriorated since the amplitude of the fluctuation of the air-fuel ratio of the exhaust gas downstream of the catalytic converter becomes large.

As explained above, if the deterioration of the catalytic converter is determined in accordance with the frequency of the reversal of the output of the downstream air-fuel ratio sensor, sometimes a normal catalytic converter is incorrectly determined as being deteriorated. In addition to that, the device in the '212 publication calculates the frequency of the reversal of the output by measuring the number of the reversals of the output in a certain fixed period. Therefore, the device in the '212 publication requires a relatively long time to calculate the frequency of the reversal of the output and, thereby, a relatively long time is required for determining the deterioration. Since the operating condition of the engine and the combustion in the cylinder always change, the cycle period and the amplitude of the fluctuation of the air-fuel ratio of the exhaust gas change even in a short period. Therefore, if the determining operation requires long time, the determination result is affected by the changes in the conditions of the exhaust gas flowing into the catalytic converter, and it is difficult to determine the deterioration of the catalytic converter accurately.

SUMMARY OF THE INVENTION

In view of the problems in the related art as set forth above, the object of the present invention is to provide a device for determining the deterioration of the catalytic converter accurately regardless of the output response of the air-fuel ratio sensors and the changes in the period and amplitude of the fluctuation of the air-fuel ratio of the exhaust gas flowing into the catalytic converter.

This object is achieved by a device, for determining deterioration of a catalytic converter, in which the device comprises an upstream air-fuel ratio sensor disposed in an exhaust gas passage of an engine upstream of a catalytic converter for detecting an air-fuel ratio of an exhaust gas upstream of the catalytic converter, a downstream air-fuel ratio sensor disposed in the exhaust gas passage of the engine downstream of the catalytic converter for detecting the air-fuel ratio of the exhaust gas downstream of the catalytic converter, air-fuel ratio feedback control means for controlling the air-fuel ratio of the exhaust gas flowing into the catalytic converter in such a manner that the air-fuel ratio of the exhaust gas flowing into the catalytic converter changes between a rich air-fuel ratio and a lean air-fuel ratio compared to a stoichiometric air-fuel ratio alternately, rich gas inflow amount calculating means for calculating the amount of HC and CO in the exhaust gas flowing into the catalytic converter based on the output of the upstream air-fuel ratio sensor when the air-fuel ratio of the exhaust gas is controlled by the air-fuel ratio feedback control means, rich gas outflow amount calculating means for calculating the amount of HC and CO in the exhaust gas flowing out from the catalytic converter based on the output of the downstream air-fuel ratio sensor when the air-fuel ratio of the exhaust gas is controlled by the air-fuel ratio feedback control means and determining means for determining a degree of deterioration of the catalytic converter based on the inflow amount of HC and CO calculated by the rich gas inflow amount calculating means and the outflow amount of HC and CO calculated by the outflow rich gas calculating means.

According to the present invention, the determination of the deterioration of the catalytic converter is performed when the air-fuel ratio of the exhaust gas flowing into the catalytic converter changes between lean and rich alternately compared to the stoichiometric air-fuel ratio. When the air-fuel ratio of the exhaust gas is on a lean side compared to the stoichiometric air-fuel ratio, the catalytic converter absorbs oxygen in the exhaust gas. When the air-fuel ratio of the exhaust gas becomes rich compared to the stoichiometric air-fuel ratio, a part of HC and CO in the exhaust gas flowing into the catalytic converter is oxidized by the oxygen released from the catalytic converter, and a part of HC and CO in the exhaust gas flowing into the catalytic converter passes through the catalytic converter without being oxidized. Since the maximum amount of oxygen stored in the catalytic converter decreases as the degree of deterioration becomes large, the amount of HC and CO oxidized by the catalytic converter becomes lower as the degree of deterioration of the catalytic converter becomes large. Therefore, the degree of deterioration of the catalytic converter can be determined in accordance with the amount of HC and CO components oxidized by the catalytic converter.

In the present invention, the rich gas inflow amount calculating means calculates the rich gas inflow amount, i.e., the amount of HC and CO in the exhaust gas flowing into the catalytic converter based on the output of the upstream air-fuel ratio sensor. The rich gas outflow amount calculating means calculates the rich gas outflow amount, i.e., the amount of HC and CO in the exhaust gas flowing out from the catalytic converter without being oxidized based on the output of the downstream air-fuel ratio sensor. Since the difference between the amount of HC and CO calculated by the rich gas inflow amount calculating means and the amount of HC and CO calculated by the rich gas outflow amount calculating means represents the amount of HC and CO oxidized by the catalytic converter, the degree of deterioration of the catalytic converter is determined based on the amounts of HC and CO calculated by the rich gas inflow amount calculating means and the rich gas outflow amount calculating means in the present invention.

BRIEF DESCRIPTION OF THE DRAWINGS

The present invention will be better understood from the description as set forth hereinafter, with reference to the accompanying drawings in which:

FIG. 7,(a)–(d), is a timing diagram explaining the air-fuel ratio control in FIGS. 3 through 6;

FIG. 8,(a)–(e), schematically illustrate a change in the fluctuation of the output of the downstream air-fuel ratio sensor in accordance with the deterioration of the catalytic converter;

FIG. 9,(a)–(e), schematically illustrate the principle used in the present invention for determining the degree of deterioration of the catalytic converter;

DESCRIPTION OF THE PREFERRED EMBODIMENT

Figure 1:
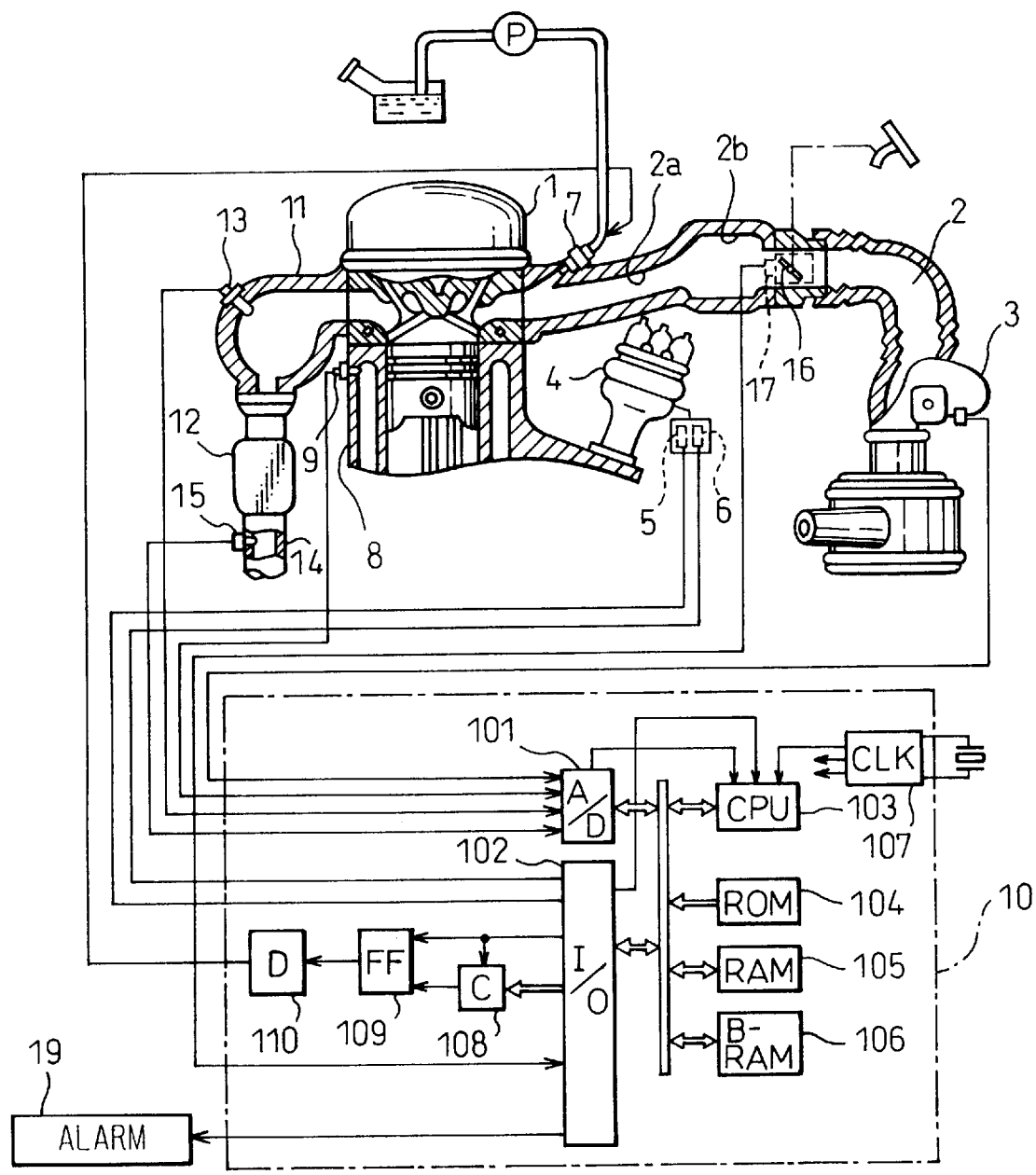
FIG. 1 schematically illustrates an embodiment of the present invention when applied to an automobile engine.

FIG. 1 schematically illustrates an embodiment of the device for determining the degree of deterioration of the catalytic converter when the present invention is applied to an automobile engine.

In FIG. 1, reference numeral 1 represents an internal combustion engine for an automobile. 2a is an intake manifold which is connected to the intake port of the respective cylinders of the engine 1. 11 is an exhaust manifold which is connected to the exhaust port of the respective cylinders of the engine 1. The intake manifold 2a is connected to an intake air passage 2 via a surge tank 2b. The intake air passage 2 of the engine 1 is provided with a potentiometer-type airflow meter 3 for detecting the amount of air drawn into the engine 1. The airflow meter 3 is, for example, a movable vane type flow meter which generates an analog voltage signal proportional to the amount of air flowing into the engine 1. The signal from the airflow meter 3 is transmitted to a multiplexer-incorporating analog-to-digital (A/D) converter 101 of a control circuit 10.

Crank angle sensors 5 and 6, for detecting the angle of the crankshaft (not shown) of the engine 1, are disposed, for example, at a distributor 4 of the engine 1.

In this embodiment, the crank angle sensor 5 generates a pulse signal at every 720° crank angle and the crank angle sensor 6 generates a pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket 8 of the cylinder block of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 has an $O_2$ storage capability and is capable of removing three pollutants in the exhaust gas, i.e., CO, HC and $NO_x$, simultaneously.

Figure 15:
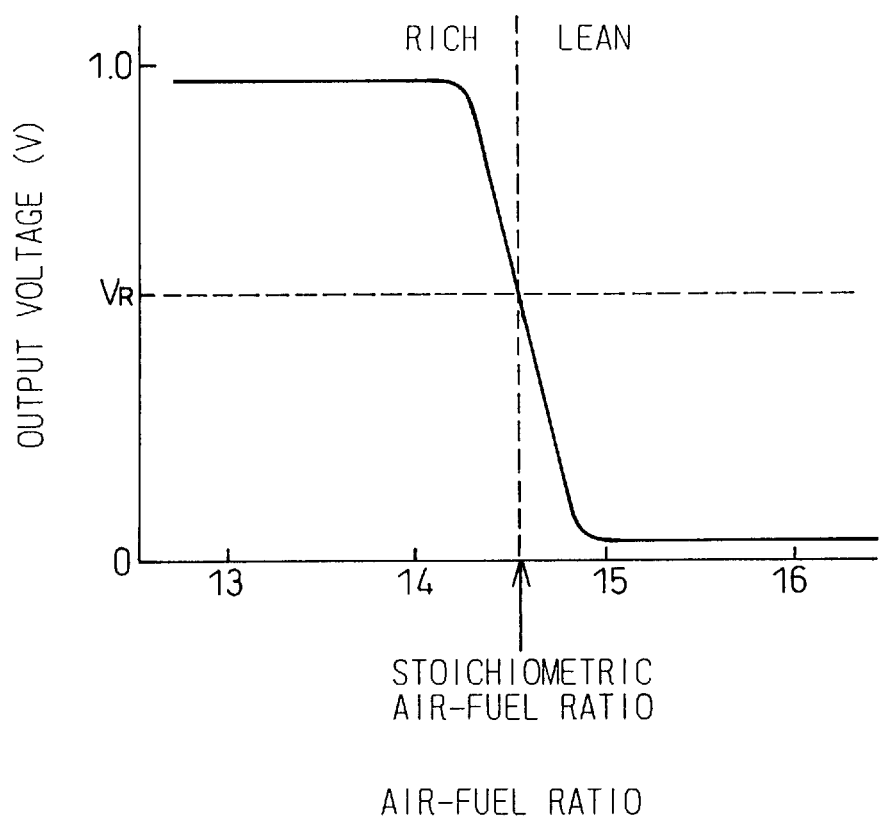
FIG. 15 is a diagram schematically illustrating the output characteristic of an $O_2$ sensor.

An upstream $O_2$ sensor 13 is provided at the exhaust manifold 11, i.e., upstream of the catalytic converter 12. A downstream $O_2$ sensor 15 is disposed at an exhaust pipe 14 downstream of the catalytic converter 12. The upstream $O_2$ sensor 13 and the downstream $O_2$ sensor 15 generate output signals corresponding to the concentration of the oxygen component in the exhaust gas. More specifically, the $O_2$ sensors 13 and 15 in this embodiment generate output voltage signals as shown in FIG. 15. As can be seen from FIG. 15, the $O_2$ sensors 13 and 15 output 1.0V voltage signal when the air-fuel ratio of the exhaust gas is rich compared to the stoichiometric air-fuel ratio, and 0V output voltage signal when the air-fuel ratio of the exhaust gas is lean compared to the stoichiometric air-fuel ratio. When the air-fuel ratio of the exhaust gas changes between rich and lean, the output voltage signals of the $O_2$ sensors 13 and 15 change suddenly near the stoichiometric air-fuel ratio and change from 1.0V to 0V or vice versa and pass the output voltage corresponding to the stoichiometric air-fuel ratio $V_R$ (the output voltage of the $O_2$ sensors corresponding to the stoichiometric air-fuel ratio is hereinafter referred to as "the reference voltage"). In this specification, the term "air-fuel ratio of the exhaust gas" means the ratio of the amounts of air and fuel supplied to the engine and exhaust gas passage upstream of a considered point. Therefore, if no air and fuel are supplied to the exhaust gas passage, the air-fuel ratio of the exhaust gas agrees with an operating air-fuel ratio of the engine (i.e., air-fuel ratio of the air-fuel mixture supplied to the engine). The signals output by the $O_2$ sensors 13 and 15 are transmitted to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the main switch of the engine is turned off.

A throttle valve 16, operated by the vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a fuel injection amount calculation routine explained later, the amount TAU is preset in the down counter 108, and simultaneously, the flip-flop 109 is set, and as a result, the drive circuit 110 initiates the activation of the fuel injection valve 7. The down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are A/D-converted, by a routine(s) executed at predetermined intervals, and then stored in the RAM 105; i.e., the data Q and THW in the RAM 105 are updated at predetermined intervals. The engine speed Ne is calculated by an interruption routine executed at every 30° crank angle, i.e., at every pulse signal from the crank angle sensor 6, and is stored in the RAM 105.

In this embodiment, the air-fuel ratio of the engine 1 is feedback controlled in the normal operation of the engine 1 based on the output signals of the $O_2$ sensors 13 and 15 in such a manner that the air-fuel ratio of the engine changes alternately between rich and lean around the stoichiometric air-fuel ratio. Further, the air-fuel ratio of the engine 1 is controlled based on the output signals of the $O_2$ sensors 13 and 15 in such a manner that the air-fuel ratio of the exhaust gas flowing into the catalytic converter fluctuates around a center value on a lean air-fuel ratio side compared to the stoichiometric air-fuel ratio when determining deterioration of the catalytic converter. By controlling the air-fuel ratio in the manner explained above, the air-fuel ratio of the exhaust gas flowing into the catalytic converter stays on a lean air-fuel ratio side a longer time when the determination is carried out and, thereby the catalytic converter absorbs oxygen in the exhaust gas to its maximum $O_2$ storage capacity. This ensures that the catalytic converter is saturated with absorbed oxygen. When the air-fuel ratio fluctuates to a rich air-fuel ratio side compared to the stoichiometric air-fuel ratio, HC and CO in the exhaust gas is purified (oxidized) by the oxygen stored in the catalytic converter. Since the maximum (saturating) amount of oxygen stored in the catalytic converter decreases as the degree of deterioration of the catalytic converter becomes larger, the amount of HC and CO oxidized by the catalytic converter decreases in accordance with the degree of deterioration of the catalytic converter. In this embodiment, the amount of HC and CO oxidized by the catalytic converter is calculated in accordance with the outputs of the $O_2$ sensors 13 and 15.

The air-fuel ratio feedback control based on the outputs of the $O_2$ sensors 13 and 15 is a prerequisite for the determining operation of the deterioration in this embodiment. Therefore, the air-fuel ratio feedback control is first explained before explaining the determining operation.

Figure 2:
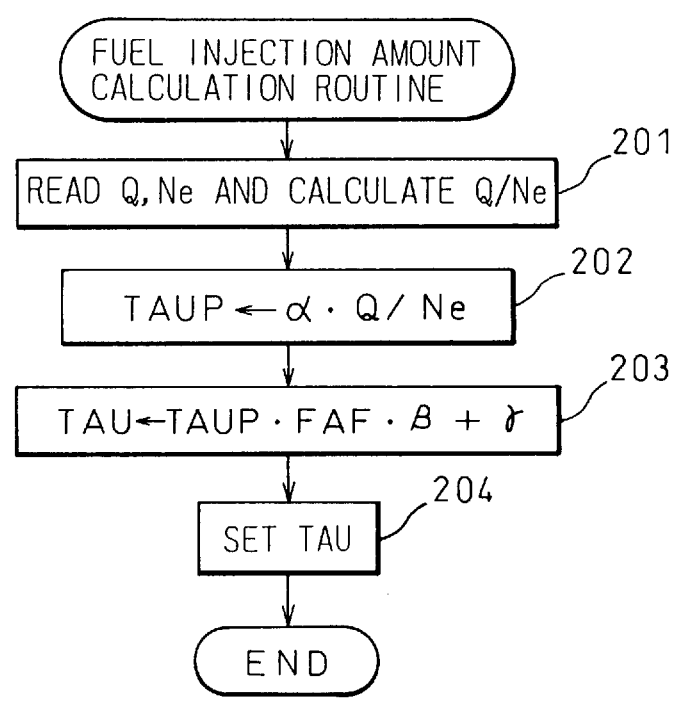
FIG. 2 is a flowchart illustrating a calculation of the amount of the fuel injection in the embodiment in FIG. 1.

FIG. 2 shows a flowchart of a fuel injection amount calculation routine of the present embodiment. The routine in FIG. 2 is processed by the control circuit 10 at predetermined crank rotation angles (for example, every 360° rotation of the crankshaft). In the routine in FIG. 2, the fuel injection amount TAU, i.e., the length of the period in which the fuel injection valve 7 injects fuel, is calculated in accordance with the amount of intake air per one revolution of the engine Q/Ne and an air-fuel ratio correction factor FAF which is explained later. Namely, in the routine in FIG. 2, the intake air amount data Q and the engine speed data Ne are read from the predetermined storage area of the RAM 105, and the value Q/Ne is calculated (step 201). Then a basic fuel injection amount TAUP is calculated in accordance with the value Q/Ne by TAUP=α×Q/Ne (at step 202). The basic fuel injection amount TAUP is a fuel injection amount required to make the air-fuel ratio of the air-fuel mixture supplied to the combustion chamber of the engine 1 stoichiometric, and α is a constant.

The actual fuel injection amount TAU is calculated from the basic fuel injection TAUP and the air-fuel ratio correction factor FAF by the following formula (step 203).

$$TAU = TAUP \times FAF \times \beta + \gamma$$

In the above formula, β and γ are constants determined in accordance with the operating conditions of the engine. When the fuel injection amount TAU is calculated by the above explained steps, the value TAU is preset at the down counter 108 at step 204 and, thereby, the amount of fuel corresponding to the value TAU is injected from the fuel injection valve 7.

Figure 3:
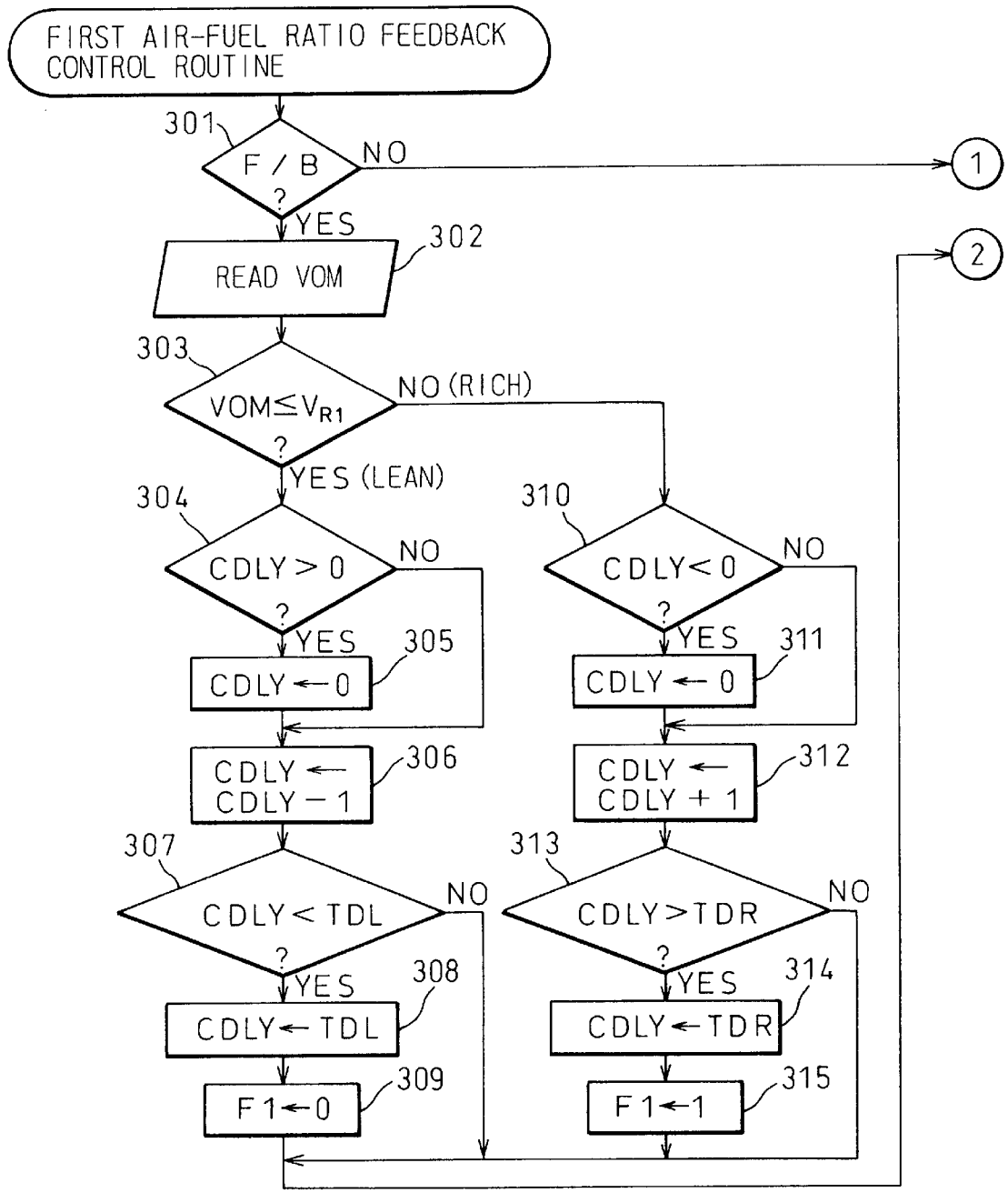
FIGS. 3 and 4 are a flowchart illustrating a first air-fuel ratio feedback control of the embodiment in FIG. 1.
Figure 4:
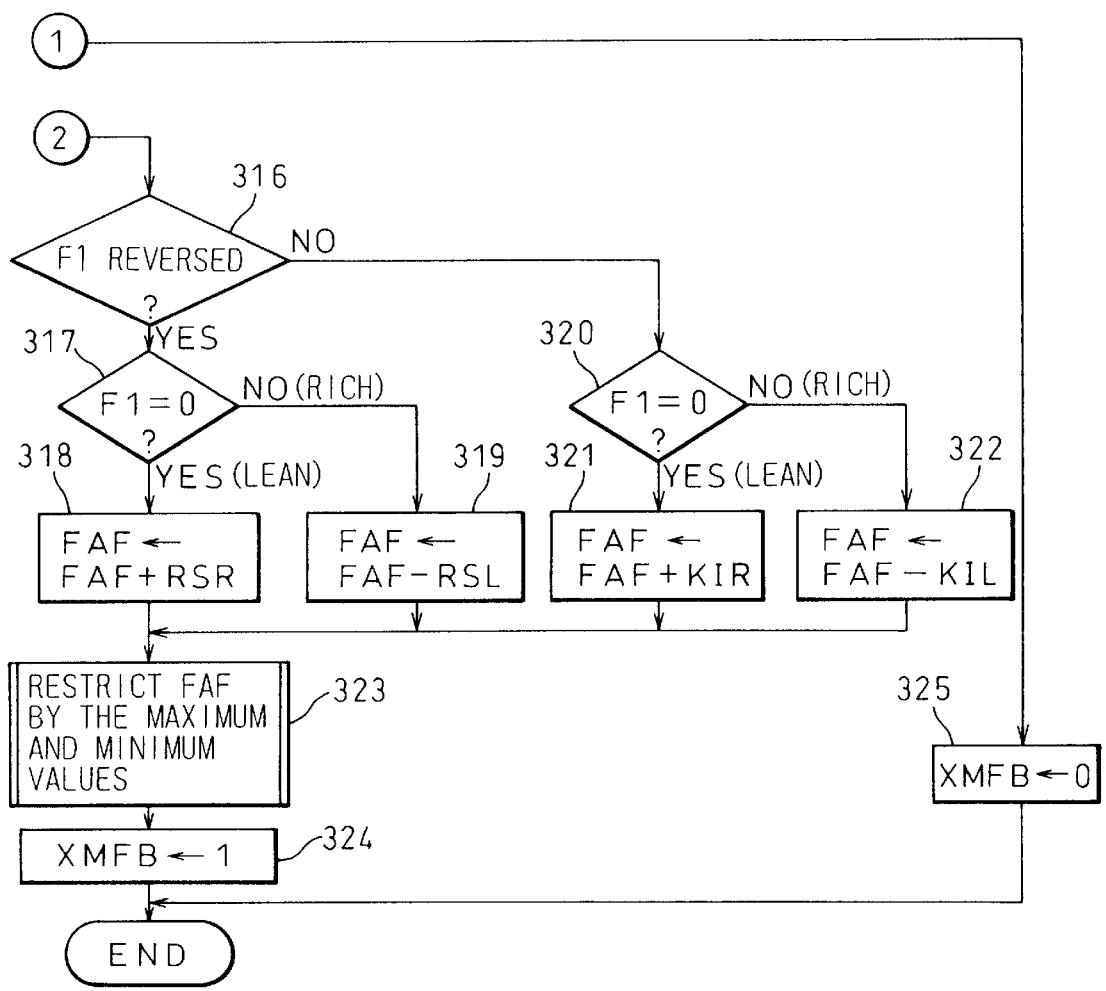

FIGS. 3 and 4 illustrate a first air-fuel ratio feedback control routine in which the value of the air-fuel ratio correction factor FAF in FIG. 2 is determined in accordance with the output signal of the upstream $O_2$ sensor 13. The routine in FIGS. 3 and 4 is processed by the control circuit 10 at a predetermined intervals (for example, every 4 ms).

In this routine, the value of the air-fuel ratio correction factor FAF is decreased when an output voltage signal VOM of the $O_2$ sensor 13 is higher than the reference voltage $V_{R1}$ (i.e., VOM>$V_{R1}$) of the $O_2$ sensor 13, and is increased when the output VOM is lower than or equal to the reference voltage $V_{R1}$ (i.e., VOM≦$V_{R1}$). As explained before, the reference voltage $V_{R1}$ is an output voltage of the $O_2$ sensor 13 which corresponds to the stoichiometric air-fuel ratio. By adjusting the value of FAF in accordance with the air-fuel ratio of the exhaust gas, the air-fuel ratio of the engine is maintained near the stoichiometric air-fuel ratio even if the characteristics of the elements in the fuel supply system such as the airflow meter 3 and the fuel injection valve 7 deviate from the design characteristics by a certain amount.

The flowchart in FIGS. 3 and 4 is explained in brief. When the routine starts in FIG. 3, at step 301, it is determined whether the conditions for performing the air-fuel ratio feedback control are satisfied. The conditions determined at step 301 are, for example, whether the $O_2$ sensor 13 is activated, whether the engine 1 is warmed up and whether a predetermined time has elapsed since a fuel cut operation (in which the fuel injection is interrupted) such as in an engine brake operation is terminated. If these conditions are satisfied at step 301, the routine in executes steps 302 and other steps, to calculate the value of FAF. If any of the conditions are not satisfied, the routine terminates after setting the value of a flag XMFB at 0 at step 325 in FIG. 4. XMFB is a flag which represents whether the first air-fuel ratio control is being performed, and XMFB=0 means that the first air-fuel ratio control is interrupted.

Steps 302 through 315 in FIG. 3 are steps for determining the air-fuel ratio of the exhaust gas. F1 in steps 309 and 315 is a flag representing whether the air-fuel ratio of the exhaust gas is on a rich side (F1=1) or on a lean side (F1=0) compared to the stoichiometric air-fuel ratio. The value of F1 is switched (reversed) from 0 to 1 (a lean condition to a rich condition) when the $O_2$ sensor 13 continuously outputs a rich signal (i.e., VOM>$V_{R1}$) for more than a predetermined time period (TDR) (steps 303 and 304 through 309). Similarly, the value of F1 is switched (reversed) from 1 to 0 (a rich condition to a lean condition) when the $O_2$ sensor 13 continuously outputs a lean signal (VOM≦$V_{R1}$) for more than a predetermined time period (TDL) (steps 303 and 310 through 315). CDLY in the flowchart is a counter for determining the timing for reversing the value of the flag F1. In this embodiment, TDL in step 307 is a negative constant and TDR in step 313 is a positive constant.

At steps 316 through 324 in FIG. 4, the value of FAF is adjusted in accordance with the value of the flag F1 set by the steps explained above. At step 316, it is determined whether the air-fuel ratio of the exhaust gas is reversed (i.e., changed from a rich air-fuel ratio to a lean air-fuel ratio, or vice versa) since the routine was last executed, by determining whether the value of F1 changed from 1 to 0 or 0 to 1). If the value of F1 changed from 1 to 0 (a rich condition to a lean condition) since the routine was last executed (steps 316 and 317), the value of FAF is increased step-wise by a relatively large amount RSR (step 318), and if the value of F1 changed from 0 to 1 (a lean condition to a rich condition) since the routine was last executed (steps 316 and 317), the value of FAF is decreased step-wise by a relatively large amount RSL (step 319). If the value of F1 did not change since the routine was last executed, and if the value of F1 is 0, the value of FAF is increased by a relatively small amount KIR every time the routine is executed, as long as the value of F1 is 0 (steps 316, 320 and 321). Similarly, if the value of F1 did not change, and if the value of F1 is 1, the value of FAF is decreased by a relatively small amount KIL every time the routine is executed (steps 316, 320 and 322).

Namely, when the value of F1 did not reverse, the value of FAF is gradually increased or decreased in accordance with whether the air-fuel ratio of exhaust gas (F1) is rich or lean. Further, the value of FAF is restricted by the maximum value (for example, 1.2) and the minimum value (for example, 0.8) to keep the value of FAF within the range determined by the maximum and the minimum values (step 323). Then, the routine terminates this time, after setting the value of the flag XMFB at 1 at step 324.

Figure 5:
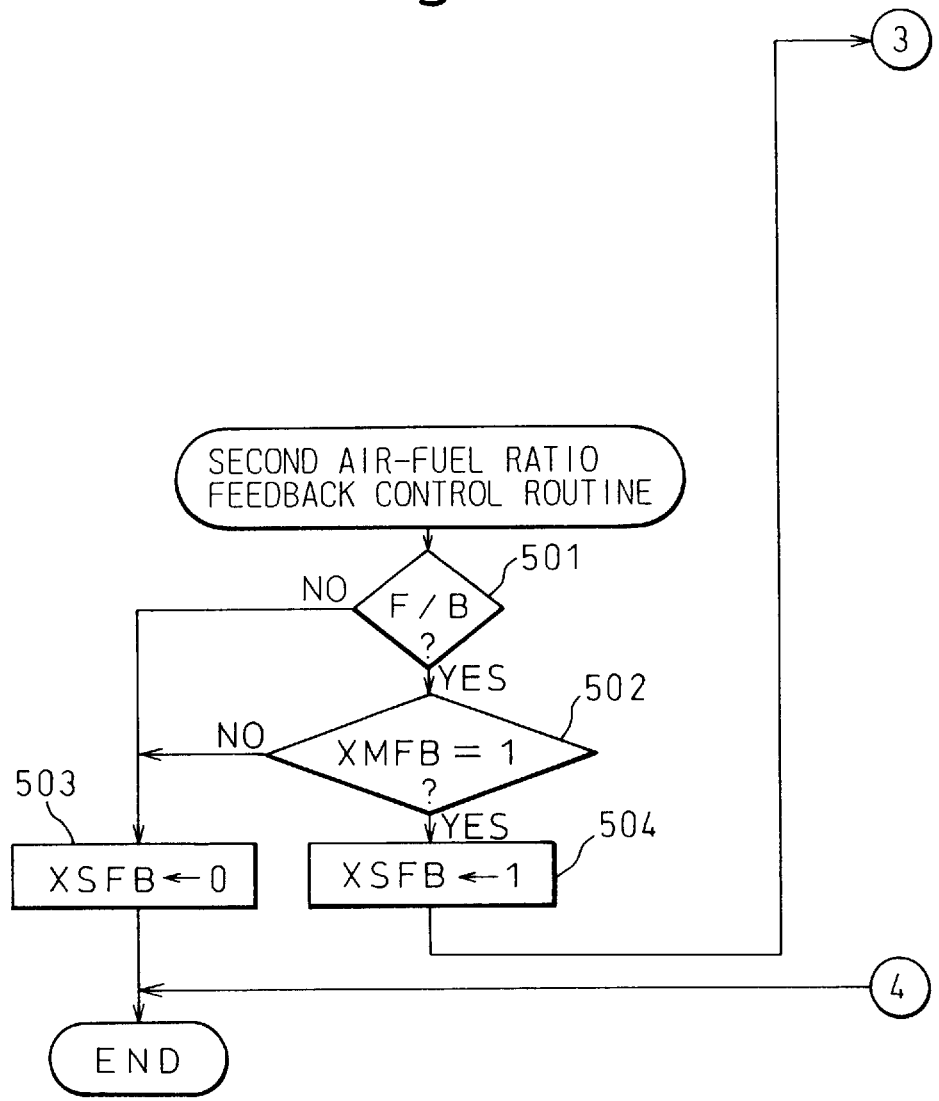
FIGS. 5 and 6 are a flowchart illustrating a second air-fuel ratio feedback control in the embodiment in FIG. 1.
Figure 6:
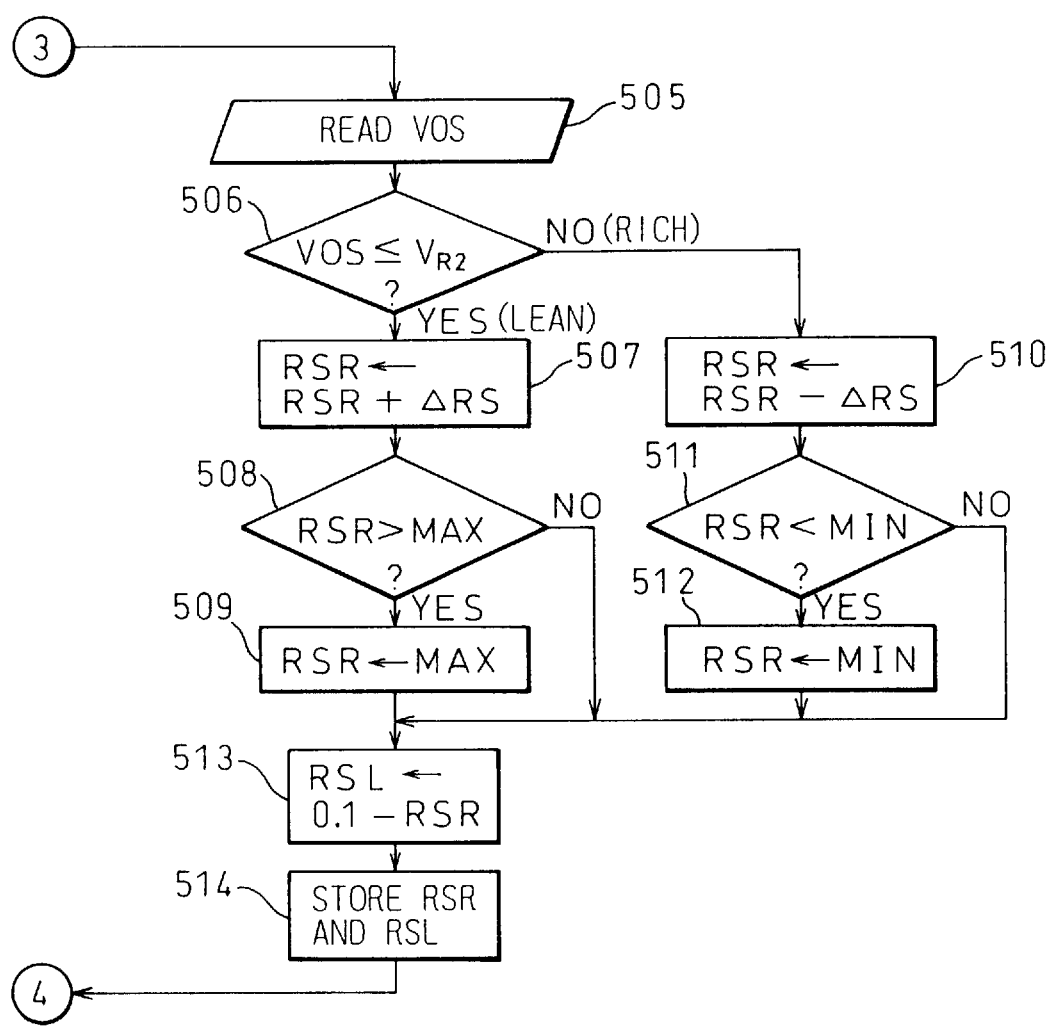

Next, a second air-fuel ratio control in which the values of RSR and RSL are determined in accordance with the output VOS of the downstream $O_2$ sensor 15 is explained. FIGS. 5 and 6 are a flowchart illustrating the second air-fuel ratio control routine of the present embodiment. In this routine, values of second air-fuel ratio correction factors RSR and RSL are calculated in accordance with the output of the downstream $O_2$ sensor 29. This routine is normally processed at intervals longer than that of the first air-fuel ratio control routine control (for example, every 500 ms).

In this routine, the output voltage VOS of the downstream $O_2$ sensor 15 is compared with a reference voltage $V_{R2}$, and the amounts RSR and RSL used in the first air-fuel ratio control routine are changed in accordance with whether VOS is larger or smaller than $V_{R2}$. The reference voltage $V_{R2}$ is an output voltage of the downstream $O_2$ sensor 15 which corresponds to the stoichiometric air-fuel ratio. When VOS>$V_{R2}$, i.e., when the air-fuel ratio of the exhaust gas downstream of the catalytic converter is rich compared to the stoichiometric air-fuel ratio, the amount RSR is decreased, and at the same time, the amount RSL is increased. Similarly, when VOS≦$V_{R2}$, i.e., when the air-fuel ratio of the exhaust gas downstream of the catalytic converter is lean compared to the stoichiometric air-fuel ratio, the amount RSR is increased and the amount RSL is decreased simultaneously. When the amount RSR becomes larger, the value of FAF also becomes larger and, thereby, the fuel injection amount determined by the routine in FIG. 2 becomes larger. On the contrary, when the amount RSL becomes larger, the value of FAF becomes smaller, and the fuel injection amount becomes smaller. Therefore, even when the characteristics of the elements in the fuel system change, the deviations from the design characteristics are corrected by the change in the values of RSR and RSL and, thereby the air-fuel ratio of the engine is maintained at the stoichiometric air-fuel ratio.

The flowchart of the second air-fuel ratio control routine in FIGS. 5 and 6 is explained hereinafter in brief.

In FIG. 5, at steps 501 and 502, it is determined whether the conditions for performing the second air-fuel ratio control are satisfied. The conditions determined at step 501 are similar to the conditions determined at step 301 in FIG. 3. However, in this routine, it is determined at step 502, whether the first air-fuel ratio control routine is being carried out, based on the value of the flag XMFB. If all the conditions in step 501 are satisfied, and the first air-fuel ratio control routine is being carried out, a value of the flag XSFB is set at 1 at step 504, and the values of RSR and RSL are adjusted at the steps 505 through 514 in FIG. 6. If any of conditions in step 501 are not satisfied, or if the first air-fuel ratio control routine is interrupted, the value of the flag XSFB is set at 0 at step 503, and the routine terminates immediately. XSFB is a flag representing whether the second air-fuel ratio control is being carried out, and XSFB=1 means that the second air-fuel ratio control is being carried out, and XSFB=0 means that the second air-fuel ratio control is interrupted.

At steps 505 through 514, the value of RSR is increased or decreased in accordance with whether the air-fuel ratio of the exhaust gas detected by the downstream $O_2$ sensor 15 is rich or lean. Namely, at step 505, the output VOS of the downstream $O_2$ sensor 15 is read through the A/D converter. At step 506, VOS is compared with the reference voltage $V_{R2}$, to determine whether the air-fuel ratio of the exhaust gas downstream of the catalytic converter is rich or lean. If $VOS \leq V_{R2}$ (lean), the value of RSR is increased by an amount ΔRS at step 507, and after that, the value of RSR is restricted by the maximum value MAX at steps 508 and 509. Similarly, the value of RSR is decreased by the amount ΔRS if $VOS > V_{R2}$ (rich) at step 510, and after that, the value of RSR is restricted by the minimum value MIN at steps 511 and 512 (for example, MIN=0.01 in this embodiment). The value of RSL is, then, calculated at step 513 by RSR=0.1−RSR. Namely, the sum of the values of RSR and RSL is always maintained at a constant value 0.1. Therefore, in the second air-fuel ratio control, when the downstream $O_2$ sensor outputs a rich air-fuel ratio signal (i.e., $VOS > V_{R2}$), RSR is decreased and RSL is increased simultaneously, and when the downstream $O_2$ sensor outputs a lean air-fuel ratio signal (i.e., $VOS \leq V_{R2}$), RSR is increased and RSL is decreased simultaneously.

FIG. 7 shows changes in the values of the counter CDLY (the curve (b) in FIG. 7), the flag F1 (the curve (c) in FIG. 7) and FAF (the curve (d) in FIG. 7) in accordance with the change in the air-fuel ratio (A/F) detected by the upstream $O_2$ sensor 13 (the curve (a) in FIG. 7) when the air-fuel ratio is controlled by the routines in FIGS. 3, 4 and 5, 6. As shown by the curve (a) in FIG. 7, the value of the flag F1 does not immediately change from 0 to 1 even when the air-fuel ratio A/F detected by the upstream $O_2$ sensor 13 changes from a lean air-fuel ratio to a rich air-fuel ratio. The value of F1 changed from 0 to 1 only when the value of the counter CDLY increases from 0 to TDR (TDR>0), i.e., the value of F1 changes from 0 to 1 when a period corresponding to the value of TDR (shown by $T_1$ in FIG. 7) has elapsed after A/F changed from a lean air-fuel ratio to a rich air-fuel ratio. Similarly, the value of F1 changes from 1 to 0 when a period (shown by $T_2$ in FIG. 7) corresponding to the value of TDL (TDL<0) has elapsed after A/F changed from a rich air-fuel ratio to a lean air-fuel ratio. Consequently, the value of F1 does not change even if A/F changes for a short time (shown by N in FIG. 7) due to, for example, noise in the output signal of the upstream $O_2$ sensor and, thereby, the stability of the air-fuel ratio control in FIGS. 3 through 6 are increased.

As a result of the first and the second air-fuel ratio feedback control, the air-fuel ratio correction factor FAF fluctuates regularly around a center value 1.0, and the operating air-fuel ratio of the engine alternates between a rich air-fuel ratio and a lean air-fuel ratio regularly. Further, as seen from the curve (d) in FIG. 7, if the value of RSR is increased and the value of RSL is decreased simultaneously by the second air-fuel ratio control in FIGS. 5 and 6, the value of FAF fluctuates more to a rich air-fuel ratio side than to a lean air-fuel ratio side and, thereby, the air-fuel ratio of the engine, as a whole, shifts to a rich air-fuel ratio side. Similarly, when the value of RSR is decreased (the value of RSL is increased) by the second air-fuel ratio control, the air-fuel ratio of the engine, as a whole, shifts to a lean air-fuel ratio side. Therefore, when the values of RSR and RSL are changed by the second air-fuel ratio control, the air-fuel ratio of the exhaust gas flowing into the catalytic converter shifts to a rich air-fuel ratio side or lean air-fuel ratio side.

In this embodiment, when the determination of the deterioration of the catalytic converter is carried out, the second air-fuel ratio feedback control is interrupted, and the values of RSR and RSL are fixed at constant values regardless of the output of the downstream $O_2$ sensor 15, as explained later. Further, the absolute value of the lean delay time TDL is set at a value larger than the absolute value of the rich delay time TDR (i.e., |TDL|>|TDR|). As understood from the curves (c) and (d) in FIG. 7, when |TDL| is set at a value larger than |TDR|, the period from the time at which the output of the $O_2$ sensor 13 reverses from rich to lean to the time at which FAF starts to increase becomes longer. Therefore, the period in which the air-fuel ratio stays on a lean air-fuel ratio side (the lean period) becomes longer than the period in which the air-fuel ratio stays on a rich air-fuel ratio side (the rich period). Thus, by setting |TDL| to a value larger than the value of |TDR|, the center value of the fluctuation of the air-fuel ratio shifts from the stoichiometric air-fuel ratio to a lean air-fuel ratio side and the air-fuel ratio of the exhaust gas becomes lean.

Next, the principle of the detection of deterioration of the catalytic converter in this embodiment is explained.

In this embodiment, deterioration of the catalytic converter is detected by determining the deterioration of the $O_2$ storage capability of the catalytic converter. As explained before, the catalytic converter performs an $O_2$ storage operation which absorbs oxygen in the exhaust gas when the air-fuel ratio of the exhaust gas flowing into the catalytic converter is lean, and releases the absorbed oxygen when the air-fuel ratio of the exhaust gas flowing into the catalytic converter is rich. Due to this $O_2$ storage operation, the fluctuation of the air-fuel ratio of the exhaust gas flowing out from the catalytic converter becomes small even when the air-fuel ratio of the exhaust gas flowing into the catalytic converter fluctuates between a rich air-fuel ratio and a lean air-fuel ratio regularly as shown by the curve (a) in FIG. 7. However, as deterioration of the catalytic converter proceeds, the $O_2$ storage capability of the catalytic converter becomes low, and the maximum amount of oxygen stored in the catalytic converter decreases. Therefore, when the catalytic converter has deteriorated, the catalytic converter releases all the oxygen stored therein within the rich period in which the air-fuel ratio of the exhaust gas is on a rich air-fuel ratio side, and thereafter, since no oxygen is released from the catalytic converter, the air-fuel ratio of the exhaust gas flowing out from the catalytic converter becomes the same as the air-fuel ratio of the exhaust gas flowing into the catalytic converter. Namely, the air-fuel ratio of the exhaust gas downstream of the catalytic converter fluctuates in the same manner as that of the exhaust gas upstream of the catalytic converter and, thereby, the frequency of the reversal of the output of the downstream $O_2$ sensor increases.

Therefore, the deterioration of the catalytic converter can be determined by monitoring the frequency of the reversal of the output of the downstream air-fuel ratio sensor 15 to some extent. However, the amount of oxygen released from the catalytic converter during the rich period changes in accordance with the amount of HC and CO in the exhaust gas. Further, the catalytic converter cannot absorb a sufficient amount of oxygen when the amount of oxygen in the exhaust gas flowing into the catalytic converter is small, or when the lean period of the fluctuation of the air-fuel ratio is short. In this case, the catalytic converter releases all the absorbed oxygen during the rich period even if the catalytic converter is normal. If this occurs, it is difficult to determine by the output of the downstream $O_2$ sensor whether the $O_2$ storage capability of the catalytic converter has actually deteriorated or only the amount oxygen stored in the catalytic converter is lowered by the change in the conditions of the exhaust gas.

This problem is illustrated by the curves of FIGS. 8(*a*) through (*e*). The curve (a) in FIG. 8 shows the response of the output VOM of the upstream $O_2$ sensor 13 when the air-fuel ratio of the exhaust gas upstream of the catalytic converter fluctuates with a short lean period and a small amplitude on the lean air-fuel ratio side. The curve (b) in FIG. 8 illustrates the change in the amount of oxygen stored in a normal catalytic converter when the air-fuel ratio of the exhaust gas upstream of the catalytic converter fluctuates as shown by the curve (a) in FIG. 8. In this case, since the lean period of the exhaust gas is short, and the amplitude of the fluctuation of the air-fuel ratio on the lean air-fuel ratio side is small, the amount of oxygen stored in the catalytic converter is small, thereby, the catalytic converter is not saturated with the absorbed oxygen, as shown by the curve (b) in FIG. 8.

The curve (c) illustrates the response of the output VOS of the downstream $O_2$ sensor when the air-fuel ratio of the exhaust gas upstream of the catalytic converter fluctuates as shown by the curve (a). Since the amount of oxygen stored (absorbed) in the catalytic converter is small, the air-fuel ratio of the exhaust gas downstream of the catalytic converter fluctuates in the same manner as that of the exhaust gas upstream of the catalytic converter, and the frequency of the reversal of the output VOS of the downstream air-fuel ratio sensor increases to the same level as that of the output VOM of the upstream air-fuel ratio sensor even though the catalytic converter is not deteriorated.

The curves (d) and (e) in FIG. 8 illustrate the change in the amount of oxygen stored in a deteriorated catalytic converter (the curve (d)) and the response of the output VOS of the downstream $O_2$ sensor (the curve (e)) when the air-fuel ratio of the upstream $O_2$ sensor fluctuates as shown by the curve (a) in FIG. 8. As shown by the curve (d), since the $O_2$ storage capability of the deteriorated catalytic converter is low, the catalytic converter is saturated with a small amount of oxygen. Therefore, also in this case, the frequency of the reversal of the output VOS of the downstream $O_2$ sensor increases to the level same as that of the output VOM of the upstream $O_2$ sensor. This means that, when the air-fuel ratio of the exhaust gas upstream of the catalytic converter fluctuates in the manner as shown by the curve (a) in FIG. 8, the frequencies of the reversal of the output VOS of the downstream $O_2$ sensor when the catalytic converter is normal (the curve (c)) and when the catalytic converter has deteriorated (the curve (d)) become the same. Therefore, it is difficult to determine the deterioration of the catalytic converter based on the frequency of the reversal of the output VOS of the downstream $O_2$ sensor.

To solve this problem, the conditions of the exhaust gas flowing into the catalytic converter are adjusted in this embodiment when the determination is carried out in such a manner that the catalytic converter absorbs oxygen to its maximum (saturating) capacity regardless of whether the catalytic converter is normal or deteriorated. After adjusting the conditions of the exhaust gas flowing into the catalytic converter, in this embodiment, the amount of HC and CO flowing into the catalytic converter (the rich gas inflow amount) and the amount of HC and CO flowing out from the catalytic converter without being oxidized (the rich gas outflow amount) in each cycle of the fluctuation of the air-fuel ratio of the exhaust gas are calculated. The amount of the oxygen stored in the catalytic converter (in this case, since the catalytic converter is saturated with the absorbed oxygen regardless of whether the catalytic converter is normal or deteriorated, the maximum $O_2$ storage capability of the catalytic converter) is determined in accordance with the rich gas inflow amount and the rich gas outflow amount. Since the maximum $O_2$ storage capability of the catalytic converter decreases as the degree of deterioration of the catalytic converter becomes large, the degree of deterioration of the catalytic converter is determined based on the rich gas inflow amount and the rich gas outflow amount in this embodiment.

More specifically, when the determination is carried out, the second air-fuel ratio feedback control is interrupted, and the values of RSR and RSL in the first air-fuel ratio feedback control are set at fixed values (for example, RSR=RSL= 0.05). Further, the absolute value of the lean delay time TDL (step 307 in FIG. 3) is set at a value larger than that of the rich delay time TDR (step 313 in FIG. 3). This causes the center of the fluctuation of the air-fuel ratio of the exhaust gas flowing into the catalytic converter to shift to a lean air-fuel ratio side and, thereby, the lean period of the fluctuation of the air-fuel ratio becomes longer and the amplitude of the fluctuation to a lean air-fuel ratio side becomes larger.

FIGS. 9(*a*)–(*e*) illustrate the principle for the determination of the deterioration in this embodiment. The curve (a) in FIG. 9 shows the response of the output VOM of the upstream air-fuel ratio sensor 13 when the center of the fluctuation of the air-fuel ratio is shifted to lean air-fuel ratio side as explained above. The curves (b) and (c) illustrate the change in the amount of oxygen stored in the catalytic converter and the response of the output VOS of the downstream air-fuel ratio sensor 15, respectively, when the catalytic converter is normal. The curves (d) and (e) illustrate the change in the amount of oxygen stored in the catalytic converter and the response of the output VOS of the downstream air-fuel ratio sensor when the catalytic converter has deteriorated.

As shown by the curves (b) and (d), since the lean period of the fluctuation of the air-fuel ratio is long, it is ensured that the catalytic converter absorbs oxygen during the lean period to its maximum (saturating) capacity regardless of whether the catalytic converter is normal (the curve (b)) or deteriorated (the curve (d)). Therefore, in this case, the amount of oxygen stored in a normal catalytic converter always becomes larger than the amount of oxygen stored in a deteriorated catalytic converter. This causes the fluctuation of the output of the downstream $O_2$ sensor to be small when the catalytic converter is normal (the curve (c)) and to be large when the catalytic converter has deteriorated (the curve (e)). Therefore, the determination of the deterioration of the catalytic converter can be accurately performed.

Further, even if a normal catalytic converter has absorbed oxygen to its maximum capacity, when the air-fuel ratio of the exhaust gas temporarily largely fluctuates to the rich air-fuel ratio side (as indicated by A in the curve (a) in FIG. 9), the catalytic converter releases all the absorbed oxygen (as indicated by B in the curve (b)). Therefore, in this case, the reversal of the output VOS of the downstream $O_2$ sensor 15 occurs (as indicated by C in the curve (c)) even though the catalytic converter is normal. However, if the portion A of the curve (c) is compared with the portion B of the curve (e), it is understood that when the catalytic converter is normal, the amount of the fluctuation of the VOS to the rich side and the length of the period in which the VOS stays on the rich side become smaller than that of the deteriorated catalytic converter (the portion E of the curve (e)). Namely, even if the air-fuel ratio of the exhaust gas flowing into the catalytic converter fluctuates to the rich side in the same manner, the fluctuation of the VOS changes in accordance with the amount of oxygen stored in the catalytic converter (i.e., in this case, the maximum oxygen absorbing (saturating) capacity of the catalytic converter). As explained before, the amount of oxygen stored in the catalytic converter can be calculated from the rich gas inflow amount (the amount of HC and CO in the exhaust gas flowing into the catalytic converter) and the rich gas outflow amount (the amount of HC and CO in the exhaust gas flowing out from the catalytic converter). Therefore, in this embodiment, the rich gas inflow amount and the rich gas outflow amount in each cycle of the fluctuation are calculated in accordance with the outputs VOM and VOS, respectively, and the deterioration of the catalytic converter is determined by comparing the rich gas inflow amount and the rich gas outflow amount.

Figure 10A:
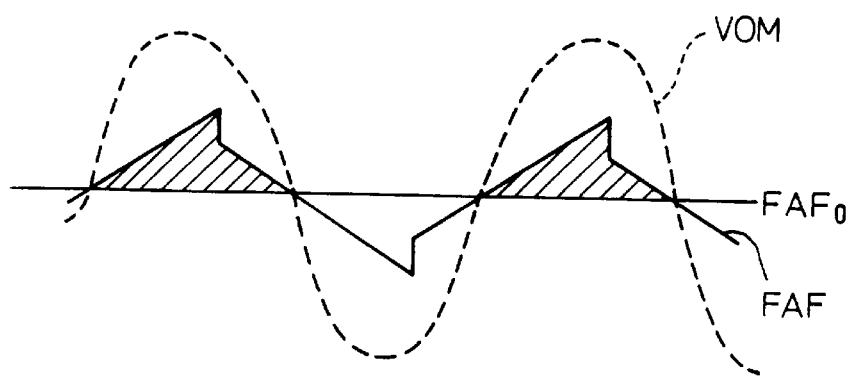
FIG. 10,(a)–(c), schematically illustrate the methods for calculating the rich gas inflow amount based on the output of the upstream air-fuel ratio sensor.
Figure 10B:
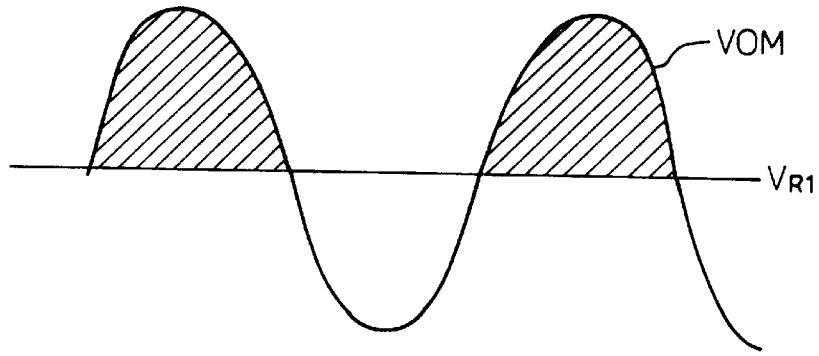
Figure 10C:
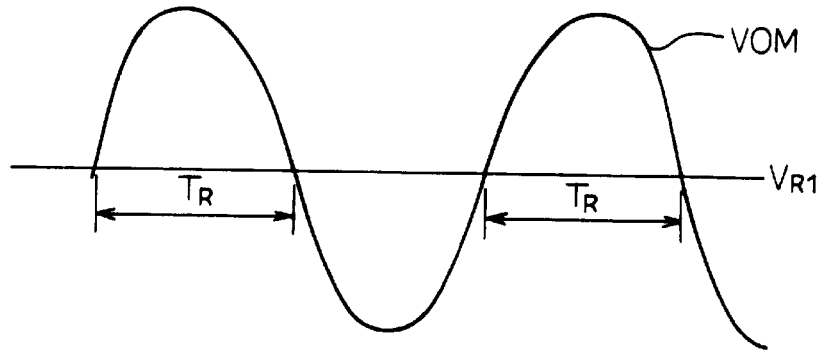

Next, the calculation of the rich gas inflow amount is explained. The diagrams of FIGS. 10(a) through (c) illustrate different methods for calculating the rich gas inflow amount. The rich gas inflow amount, i.e., the amount of HC and CO in the exhaust gas flowing into the catalytic converter is nearly proportional to the degree of richness and the length of the rich period of the exhaust gas flowing into the catalytic converter, provided other conditions of the exhaust gas are the same. The diagram (a) in FIG. 10, which is similar to the diagram (d) in FIG. 7, shows the change in the air-fuel ratio correction factor FAF when the first air-fuel ratio control is carried out. The degree of richness of the exhaust gas flowing into the catalytic converter is considered as being proportional to the excess amount of fuel supplied to the engine. Further, the excess amount of the fuel supplied to the engine is proportional to the difference between the value of the air-fuel ratio correction factor FAF and a value $FAF_0$ which is the value of air-fuel ratio correction factor FAF required to make the air-fuel ratio mixture supplied to the engine stoichiometric (refer to diagram (a) in FIG. 10). Namely, the degree of richness of the air-fuel ratio of the exhaust gas flowing into the catalytic converter is proportional to the value $|FAF-FAF_0|$. Therefore, it can be considered that the rich gas inflow amount is proportional to the product of the value $|FAF-FAF_0|$ and the length of the rich period, i.e., the value obtained by integrating $|FAF-FAF_0|$ over the rich period. This value is equal to the area of the hatched portion in the diagram (a) in FIG. 10. Therefore, the value of the rich gas inflow amount can be obtained by calculating the area of the hatched portion in the diagram (a) in FIG. 10.

The diagram (b) in FIG. 10 shows the response of the output VOM of the upstream air-fuel ratio when the air-fuel ratio control is carried out. It is also considered that the degree of richness of the exhaust gas flowing into the catalytic converter is proportional to the difference between the value of VOM and the reference voltage $V_{R1}$ (the output of the upstream air-fuel ratio sensor corresponding to the stoichiometric air-fuel ratio), as seen from the diagram (a) in FIG. 10. Therefore, the rich gas inflow amount also can be obtained by calculating the area of the hatched portion in the diagram (b) in FIG. 10, i.e., the area surrounded by the output response curve of the upstream air-fuel ratio during the rich period and the reference voltage $V_{R1}$. This area is calculated by integrating the value $|VOM-V_{R1}|$ over the rich period.

Further, the hatched area in the diagram (b) is approximately proportional to the length of the rich period (indicated by $T_R$ in the diagram (c) in FIG. 10). Therefore, the rich gas inflow amount also can be obtained by calculating the length of the rich period $T_R$.

In this embodiment, the rich gas inflow amount is calculated in accordance with the output VOM of the upstream air-fuel ratio sensor using one of the methods illustrated by the diagrams (a) through (c) in FIG. 10.

Figure 11A:
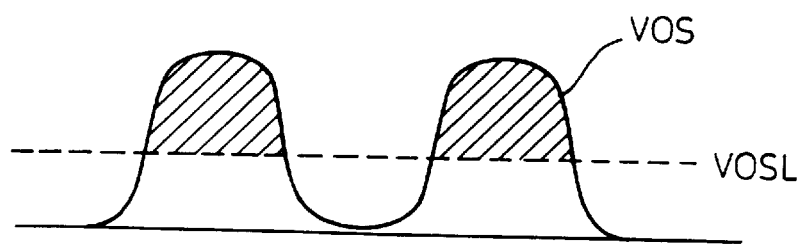
FIG. 11,(a)–(b), schematically illustrate the methods for calculating the rich gas outflow amount based on the output of the downstream air-fuel ratio sensor.
Figure 11B:
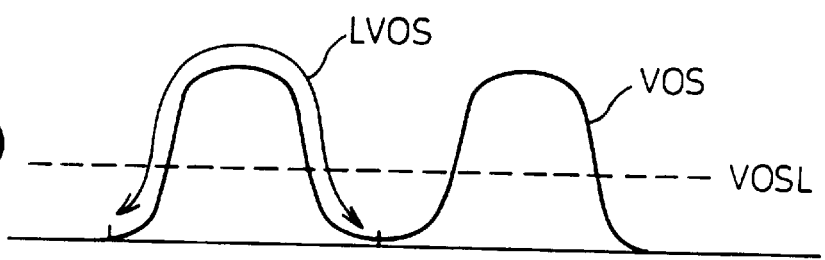

The diagrams of FIGS. 11(a) and (b) illustrate the methods for calculating the rich gas outflow amount. The diagram (a) in FIG. 11 illustrates the method for calculating the rich gas outflow amount which is similar to the method illustrated by the diagram (b) in FIG. 10. In the diagram (a), the broken line designates a lean output VOSL which is the output of the downstream air-fuel ratio sensor 15 when the output VOM of the upstream air-fuel ratio sensor 13 changes from lean to rich. Since it is considered that the rich gas outflow amount becomes 0 at the end of the lean period, the value of the lean output VOSL, which is the output of the downstream air-fuel ratio sensor at the end of the lean period, is considered to be the output of the downstream air-fuel ratio sensor when the rich gas outflow amount is 0. Therefore, similarly to the method in the diagram (a) in FIG. 10, it is considered that the rich gas outflow amount is proportional to the area surrounded by the output VOS and the lean output VOSL, i.e., the area of the hatched portion in the diagram (a) in FIG. 11. Therefore, the rich gas outflow amount can be obtained by calculating the area of the hatched portion in the diagram (a) in FIG. 11.

The diagram (b) in FIG. 11 illustrates another method for calculating the rich gas outflow amount. As explained above, the rich gas outflow amount is proportional to the area of the hatched portion in the diagram (a) in FIG. 11. This area is approximately equal to the length of the response curve of the output VOS of the downstream air-fuel ratio sensor (the length LVOS in the diagram (b)). Further, the length LVOS is approximately calculated by integrating the value $|VOS-VOS_{i-1}|$. VOS is the value of the downstream air-fuel ratio sensor sampled this time and $VOS_{i-1}$ is the value of the output of the downstream air-fuel ratio sensor last sampled. Therefore, the rich gas outflow amount also can be obtained by integrating the value $|VOS-VOS_{i-1}|$.

In this embodiment, the rich gas outflow amount is calculated in accordance with the output VOS of the downstream air-fuel ratio sensor using one of the methods illustrated by the diagrams (a) and (b) in FIG. 11.

Figure 12:
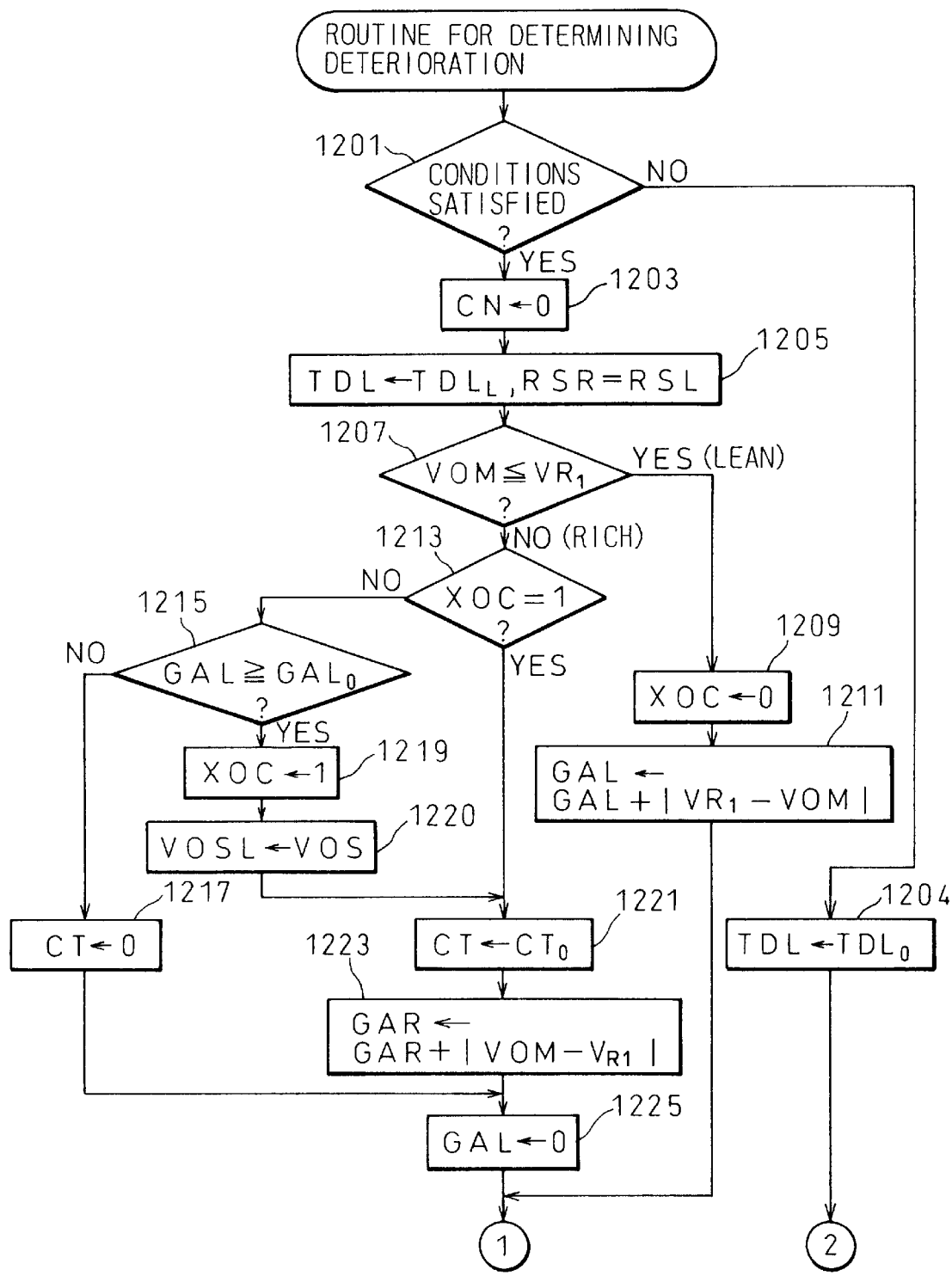
FIGS. 12 and 13 are a flowchart illustrating an embodiment of the routine for determining the degree of deterioration of the catalytic converter.
Figure 13:
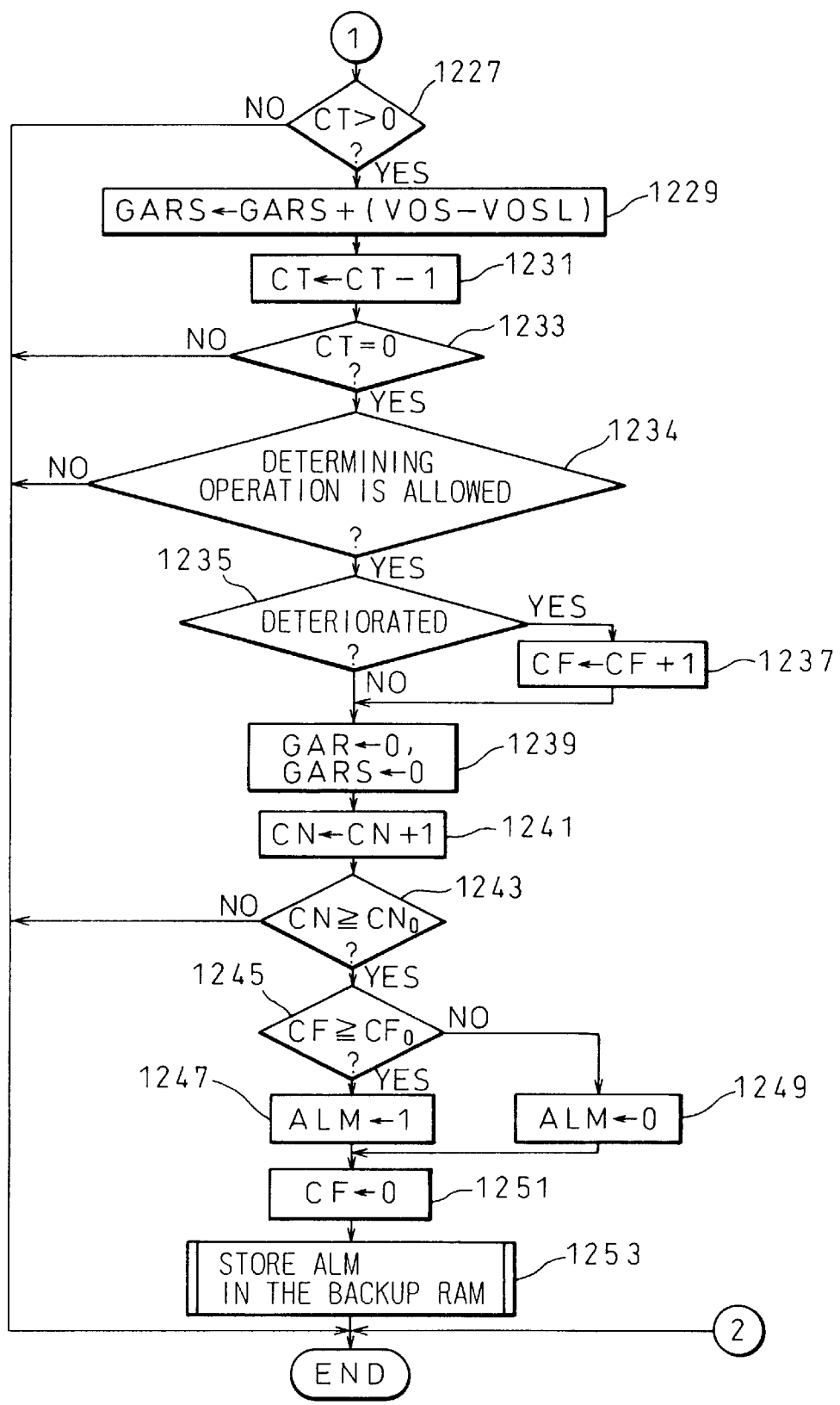

FIGS. 12 and 13 illustrate an example of the routine for determining the deterioration of the catalytic converter in this embodiment. This routine is processed by the control circuit 10 at predetermined intervals.

In FIG. 12, at step 1201, it is determined whether the conditions for carrying out the determination of deterioration is satisfied. The conditions tested at step 1201 are; (1) the first air-fuel ratio feedback control routine (FIGS. 3 and 4) is being executed; (2) the engine is operated in an idle condition; (3) the second air-fuel ratio control routine (FIGS. 5 and 6) is interrupted; (4) the engine operation is stable.

The above condition (1) is required since the determination of deterioration must be carried out when the engine air-fuel ratio is controlled by the first air-fuel ratio feedback control in such a manner that the air-fuel ratio of the exhaust gas flowing into the catalytic converter fluctuates as shown by the diagram (a) in FIG. 9. This condition is determined based on whether the value of the flag XMFB (FIG. 4, steps 324 and 325) is 1. The above condition (2) is required in order to perform the determining operation when the flow rate of the exhaust gas is nearly constant. This condition is determined based on whether the LL signal from the idle switch 17 is ON (LL=1).

The above condition (3) is required for controlling the air-fuel ratio in such a manner that the center of the fluctuation of the air-fuel ratio shifts to the lean air-fuel ratio side as illustrated b the diagram (a) in FIG. 8. As explained before, the determining operation must be performed in the condition in which the center of the fluctuation of the air-fuel ratio is shifted to the lean air-fuel ratio side in this embodiment. However, if the second air-fuel ratio feedback control is executed, the center of the fluctuation is controlled to the stoichiometric air-fuel ratio by the second air-fuel ratio feedback control. Therefore, in this embodiment, it is necessary to perform the determining operation under the condition in which the second air-fuel ratio feedback control is being interrupted. This condition is determined based on whether the value of the flag XSFB (FIG. 5, steps 503 and 504) is set to 0.

The above condition (4) is required for performing the determination when the air-fuel ratio of the exhaust gas fluctuates regularly. In this embodiment, it is determined that the engine operation is stable when the change in the intake air amount of the engine since the routine was last executed is smaller than a predetermined value. Alternatively, this condition may be determined based on the changes in the engine speed instead of the intake air amount.

If any of the above conditions (1) through (4) is not satisfied at step 1201, the routine proceeds to step 1204 to set the lean delay time TDL used in the first air-fuel ratio feedback to a value $TDL_0$, which is a fixed value used for the normal operation, and after that, the routine terminates without carrying out the determination of deterioration. If all of the conditions (1) through (4) are satisfied at step 1201, the routine proceeds to step 1203 to set the value of the counter CN to 0. The counter CN is explained later. The routine, then, proceeds to step 1205. At step 1205, the value of the lean delay time TDL is set to $TDL_L$, the absolute value thereof is larger than $TDL_0$ ($|TDL_L|>|TDL_0|$) and the values of RSR and RSL are set to the same fixed value (RSR=RSL). By setting the lean delay time TDL to $TDL_L$, the center of the fluctuation of the air-fuel ratio shifts to the lean air-fuel ratio side compared to the stoichiometric air-fuel ratio.

At step 1207, it is determined whether the air-fuel ratio of the exhaust gas flowing into the catalytic converter is lean by comparing the output VOM of the upstream $O_2$ sensor 13 with the reference voltage $V_{R1}$. If the air-fuel ratio is lean, i.e., if VOM$\leq V_{R1}$, the value of a flag XOC is set to 0 at step 1209, and after that, the amount of oxygen GAL in the exhaust gas flowing into the catalytic converter is calculated at step 1211.

The oxygen amount GAL is calculated by integrating the absolute value of the difference between the output VOM and the reference voltage $V_{R1}$ (i.e., $|VOM-V_{R1}|$). The integrated value of $|VOM-V_{R1}|$ approximately represents the area surrounded by the response curve of the output VOM and the reference voltage $V_{R1}$. As explained by the diagram (b) in FIG. 10, this area represents the amount of HC and CO when the air-fuel ratio of the exhaust gas flowing into the catalytic converter when the air-fuel ratio of the exhaust gas is lean. However, when the air-fuel ratio of the exhaust gas flowing into the catalytic converter is lean, this area represents the excess amount of oxygen (the amount of oxygen in excess of the amount required for making the air-fuel mixture supplied to the engine stoichiometric). Therefore, since the air-fuel ratio of the exhaust gas flowing into the catalytic converter is lean when step 1211 is executed, this area, i.e., GAL represents the amount of oxygen not used by the engine for combustion and the amount of oxygen flowing into the catalytic converter during the lean period.

If the exhaust gas flowing into the catalytic converter is rich (VOM>$V_{R1}$) at step 1207, the routine proceeds to step 1213 to determine whether the value of the flag XOC is set to 1. If XOC$\neq$1, it is determined at step 1215 whether the amount of oxygen (GAL) flowing into the catalytic converter which is calculated during the lean period is larger than or equal to a predetermined value $GAL_0$. In this embodiment, it is required to perform the determination of the deterioration when the catalytic converter is saturated with the absorbed oxygen. Therefore, a sufficient amount of oxygen must be supplied to the catalytic converter during the lean period before performing the determination of the deterioration. Therefore, in this embodiment, it is determined whether the amount of oxygen supplied to the catalytic converter (GAL) is larger than the amount of oxygen sufficient to saturate a normal catalytic converter. $GAL_0$ in step 1215 is an amount of oxygen which is sufficient to saturate a normal catalytic converter, and is determined by experiment using the actual catalytic converter.

If GAL<$GAL_0$ at step 1215, since this means that the catalytic converter is not saturated with the absorbed oxygen, the routine executes steps 1217 and 1225 to clear the values of GAL and a counter CT. The counter CT is explained later. In this case, the determination of the deterioration of the catalytic converter is not performed.

If GAL$\leq GAL_0$, at step 1215, since this means that the catalytic converter is saturated with the absorbed oxygen even if it is normal, the routine executes step 1219 to set the value of the flag XOC to 1, and step 1220 to store the present value of the output VOS of the downstream $O_2$ sensor 13 as the lean output VOSL. When the value of the flag XOC is set to 1, the routine proceeds to step 1221 directly from step 1213 in the next execution of the routine. Namely, the flag XOC has the function to determine the value of the lean output VOSL by performing steps 1215 to 1220 only when the output of the upstream $O_2$ sensor changes from rich to lean.

At step 1221, the value of the counter CT is set to a predetermined value $CT_0$, and at step 1223, the value GAR is calculated by integrating the absolute value of the difference between the output VOM of the upstream $O_2$ sensor 13 and the reference voltage $V_{R1}$ (i.e., $|VOM-V_{R1}|$). Since the air-fuel ratio of the exhaust gas flowing into the catalytic converter is rich when step 1223 is executed, the integrated value GAR approximately represents the area of the hatched portion in the diagram (b) in FIG. 10. Namely, GAR in this embodiment represents the rich gas inflow amount (the amount of HC and CO in the exhaust gas flowing into the catalytic converter) as explained by the diagram (b) in FIG. 10. After executing these steps, the value of GAL calculated at step 1211 is cleared to prepare for the next determining operation at step 1225. The routine, then, proceeds to step 1227 in FIG. 13.

At step 1227, the routine determines whether the value of the counter CT is positive, and if the value of CT is not positive (i.e., CT$\leq$0), the routine terminates without performing steps 1229 and after. Namely, when GAL<$GAL_0$ at step 1215, since the value of the counter CT is cleared at step 1217, the determining operation of steps 1229 and after is not performed.

If the value of CT is positive (i.e., CT>0), the routine executes step 1229 to calculates GARS by integrating the absolute value of the difference between the output VOS of the downstream $O_2$ sensor 15 and the lean output VOSL stored in step 1220. Further, the value of the counter CT is decreased by 1 at step 1231, and at step 1233, it is determined whether the value of CT after it is decreased becomes 0. Since the integrated value of $|VOS-VOSL|$ approximately represents the area of the hatched portion in the diagram (a) in FIG. 11, the value of GARS represents the rich gas outflow amount (the amount of HC and CO in the exhaust gas flowing out from the catalytic converter). In this embodiment, the value of the counter CT is set to $CT_0$ at step 1221 when the output VOM of the upstream $O_2$ sensor is rich. Therefore, the value of the counter CT starts to decrease when the output VOM changes from a rich condition to a lean condition.

If the value of the counter CT is 0 at step 1233, the deterioration of the catalytic converter is determined at steps 1234 and 1235 based on the rich gas inflow amount GAR calculated at step 1223 and the rich gas outflow amount GARS calculated at step 1229.

In this embodiment, though the rich gas inflow amount GAR (step 1223) is integrated only during the period in which the output VOM of the upstream $O_2$ sensor is rich (step 1207), the integration of the rich gas outflow amount GARS starts when the output VOM of the upstream $O_2$ sensor changes from a lean condition to a rich condition (steps 1207 and 1221) and continues until the value of the counter decreases to 0 (step 1227). Since the value of the counter CT starts to decrease when the output VOM of the upstream $O_2$ sensor changes from a rich condition to a lean condition (steps 1207 and 1231), the integration of the rich gas outflow amount GARS starts when the output VOM of the upstream $O_2$ sensor changes from a lean condition to a rich condition and continues until a time corresponding to $CT_0$ has elapsed after the output VOM of the upstream $O_2$ sensor changes from a rich condition to a lean condition. $CT_0$ is a value which corresponds to the time required for the exhaust gas in an engine idle operation to flow the distance between the positions of the upstream $O_2$ sensor 13 and the downstream $O_2$ sensor 15, and determined by experiment using the actual engine and exhaust system. Namely, in this embodiment, the delay time due to the distance between the upstream and downstream $O_2$ sensors is taken into consideration when the rich gas outflow amount GARS is calculated and, thereby, the calculated value of the rich gas outflow amount GARS accurately corresponds to the calculated value of the rich gas inflow amount GAR. Thus, the accuracy of the determination based on the rich gas inflow amount GAR and the rich gas outflow amount GARS is improved.

Figure 14:
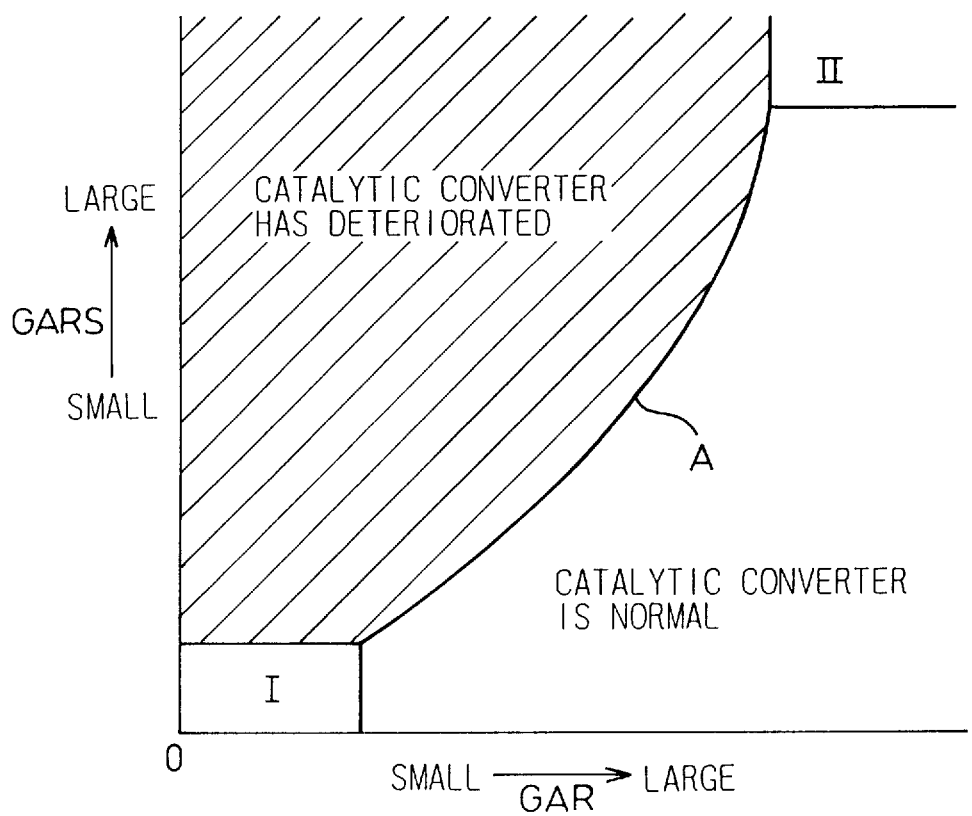
FIG. 14 is a map used for determining the degree of deterioration of the catalytic converter.

Next, the determining operation in step 1235 is explained. In this embodiment, the deterioration of the catalytic converter is determined in accordance with the map illustrated in FIG. 14 based on the calculated rich gas inflow amount GAR and the rich gas outflow amount GARS. In FIG. 14, the vertical axis and the horizontal axis represent the rich gas outflow amount GARS and the rich gas inflow amount GAR, respectively, and the curve A represents a threshold for determining the deterioration.

As explained before, when the exhaust gas containing HC and CO flows into the catalytic converter, the amount of HC and CO in the exhaust gas corresponding to the amount of oxygen stored in the catalytic converter is oxidized, and the remaining HC and CO in the exhaust gas flows out from the catalytic converter without being oxidized. Therefore, if the amount of HC and CO flowing into the catalytic converter is the same, the amount of HC and CO flowing out from the catalytic converter without being oxidized becomes larger as the amount of oxygen stored in the catalytic converter becomes small. In this embodiment, since the catalytic converter is saturated with oxygen, i.e., the catalytic converter has absorbed oxygen to its maximum capacity before the determination is carried out, the amount of HC and CO flowing out from the catalytic converter becomes larger as the maximum oxygen absorbing capacity becomes small. Therefore, if the amounts of HC and CO flowing into the catalytic converter (i.e., the rich gas inflow amount) is the same, it is considered that the degree of deterioration is larger as the amount of HC and CO flowing out from the catalytic converter (i.e., the rich gas outflow amount) becomes larger. However, since the rich gas inflow amount is not always the same in the actual operation of the engine, the degree of deterioration of the catalytic converter cannot be determined based solely on the rich gas outflow amount. Namely, even if the degree of deterioration of the catalytic converter is the same, the rich gas outflow amount increases as the rich gas inflow amount increases. Therefore, the threshold of the rich gas outflow amount for determining the deterioration of the catalytic converter must be set in conjunction with the rich gas inflow amount. The curve A in FIG. 14 shows the threshold of the rich gas inflow amount when the rich gas inflow amount changes. In this embodiment, when a set of the values of the rich gas inflow amount GAR and the rich gas outflow amount GARS falls in the region above the curve A (i.e., the hatched region) in FIG. 14, it is determined that the catalytic converter has deteriorated. The actual threshold varies in accordance with the degree of deterioration at which the catalytic converter is determined as being deteriorated, the type and the size of the catalytic converter, therefore, it is preferable to determine the curve A in FIG. 14 based on experiment using the actual catalytic converter. In this embodiment, the curve A is obtained by measuring the rich gas outflow amount using a catalytic converter deteriorated to a practically acceptable limit under various rich gas inflow amount conditions. Namely, the curve A in this embodiment represents the practical threshold, and if the $O_2$ storage capability of the catalytic converter deteriorates further than this threshold, replacement of the catalytic converter is required. In this embodiment, the curve A is determined by the degree of deterioration of the catalytic converter used in the experiment. Therefore, by determining curve A using a catalytic converter which has an appropriate degree of deterioration, the degree of deterioration at which the catalytic converter should be determined as being deteriorated can be set arbitrarily.

The area I and II in FIG. 14 represent regions in which the deterioration of the catalytic converter cannot be determined. For example, in the region I, both the rich gas inflow amount GAR and the rich gas outflow amount GARS are extremely small. When the rich gas inflow amount GAR is very small, the rich gas outflow amount GARS may become very small even if the catalytic converter has deteriorated. Therefore, in this embodiment, the determining operation is not performed when both the rich gas inflow amount GAR and the rich gas outflow amount GARS are very small. Further, in the region II in FIG. 14, both the rich gas inflow amount GAR and the rich gas outflow amount GARS are very large. When the rich gas outflow amount GAR is very large, the rich gas outflow amount GARS may become very large even if the catalytic converter is normal. Therefore, in this embodiment, the determining operation is not performed when both the rich gas inflow amount GAR and the rich gas outflow amount GARS are very large.

Referring to FIG. 13 again, step 1234 shows the operation for determining whether the rich gas inflow amount GAR and the rich gas outflow amount GARS are within the range which allows the determination of the deterioration of the catalytic converter. Namely, at step 1234, it is determined whether the set of the values of GAR and GARS falls in the region other than the regions I and II in FIG. 14. If the set of the values of GAR and GARS falls in either of the regions I and II at step 1234, the routine in FIG. 13 terminates without determining the deterioration of the catalytic converter. If GAR and GARS are within the region other than the regions I and II in FIG. 14, the routine executes step 1235 to determine whether the catalytic converter has deteriorated based on the values of GAR and GARS using the map in FIG. 14. As seen from FIGS. 12 and 13, if the conditions allows, the determination of the deterioration is performed every time the routine is performed.

When the catalytic converter is determined as being deteriorated at step 1235, both of counters CF and CN are increased by 1 at steps 1237 and 1241, respectively. However, if the catalytic converter is determined as being normal at step 1235, only the counter CN is increased at step 1241, and the value of the counter CF is maintained. Therefore, the value of the counter CN represents the total number of the execution of the determining operation, and the value of CF represents the number of the determination in which the catalytic converter is determined as being deteriorated.

In this embodiment, the determining operation is carried out in a predetermined number, and if the catalytic converter is determined as being deteriorated more than a certain number, it is determined that the catalytic converter has actually deteriorated. Namely, at step 1243 in FIG. 13, it is determined whether the number of the determining operations (CN) reaches a predetermined number $CN_0$, and if CN reaches $CN_0$, i.e., if $CN \geq CN_0$, it is further determined whether the number of determination CF in which the catalytic converter is determined as being deteriorated has reached a predetermined value $CF_0$ at step 1245. Then, if $CF \geq CF_0$ at step 1245, the value of a deterioration flag ALM is set to 1 at step 1247, and if $CF < CF_0$ at step 1245, the value of the deterioration flag ALM is set to 0 at step 1249. When the value of the deterioration flag ALM is set to 1, the alarm 19 in FIG. 1 is activated by the control circuit 10 to notify the driver that the catalytic converter has deteriorated. Further, the value of the counter CF is cleared at step 1251 to prepare for the next determining operation, then, the routine terminates after executing step 1253 in which the value of the flag ALM is stored in the backup RAM 106 to prepare for repair and inspection.

The reason why the counter CF is used for determining the deterioration of the catalytic converter is that, if the deterioration of the catalytic converter is determined based on only one determining operation of step 1235, the determination result may be affected by temporary disturbances such as an irregular combustion of the engine. Therefore, in this embodiment, the determining operation is carried out a predetermined number of times, and the catalytic converter is determined as being deteriorated only when the catalytic converter is determined as being deteriorated more than a certain number of times. However if the engine is operated in a very stable condition and, thereby, the conditions of the exhaust gas flowing into the catalytic converter are stable, the deterioration of the catalytic converter may be determined in accordance with only one determination result.

As explained above, since the deterioration of the catalytic converter is determined based on the rich gas inflow amount calculated in accordance with the output of the upstream $O_2$ sensor and the rich gas outflow amount calculated in accordance with the output of the downstream $O_2$ sensor, the determination is not affected by the factors such as the responses of the upstream and downstream $O_2$ sensor, the cycle period and the amplitude of the fluctuation of the air-fuel ratio of the exhaust gas. Further, the conditions for performing the determining operation is tested in every fluctuation cycle of the air-fuel ratio of the exhaust gas, and if the conditions are satisfied, the determining operation is performed also in every fluctuation cycle. Therefore, according to this embodiment, even if the changes in the cycle period and the amplitude of the fluctuation of the air-fuel ratio of the exhaust gas due to an irregular combustion occur, the deterioration of the catalytic converter is determined accurately.

In this embodiment, the determining operation is performed every time the conditions in step 1201 in FIG. 12 are satisfied. However, a preliminary determining operation, for example, based on the frequency of the reversal of the output of the downstream $O_2$ sensor may be performed in addition to the determining operation in FIGS. 12 and 13, and the determining operation in FIGS. 12 and 13 may be performed only when the catalytic converter is determined as being deteriorated in the preliminary determining operation.

I claim:

1. A device for determining deterioration of a catalytic converter having an $O_2$ storage capability and disposed in an exhaust gas passage of an engine comprising:

an upstream air-fuel ratio sensor disposed in an exhaust gas passage of an engine upstream of a catalytic converter for detecting an air-fuel ratio of an exhaust gas upstream of the catalytic converter;

a downstream air-fuel ratio sensor disposed in the exhaust gas passage of the engine downstream of the catalytic converter for detecting the air-fuel ratio of the exhaust gas downstream of the catalytic converter;

air-fuel ratio feedback control means for controlling the air-fuel ratio of the exhaust gas flowing into the catalytic converter in such a manner that the air-fuel ratio of the exhaust gas flowing into the catalytic converter changes between a rich air-fuel ratio and a lean air-fuel ratio compared to a stoichiometric air-fuel ratio alternately;

rich gas inflow amount calculating means for calculating the amount of HC and CO in the exhaust gas flowing into the catalytic converter based on the output of the upstream air-fuel ratio sensor when the air-fuel ratio of the exhaust gas is controlled by said air-fuel ratio feedback control means;

rich gas outflow amount calculating means for calculating the amount of HC and CO in the exhaust gas flowing out from the catalytic converter based on the output of the downstream air-fuel ratio sensor when the air-fuel ratio of the exhaust gas is controlled by said air-fuel ratio feedback control means; and determining means for determining a degree of deterioration of the catalytic converter based on the inflow amount of HC and CO calculated by said rich gas inflow amount calculating means and the outflow amount of HC and CO calculated by the outflow rich gas calculating means.

2. A device according to claim 1, wherein said rich gas inflow amount calculating means calculates said inflow amount of HC and CO based on the output of the upstream air-fuel ratio sensor during a rich gas inflow amount calculating period which starts when the air-fuel ratio detected by the upstream air-fuel ratio changes from lean to rich compared to the stoichiometric air-fuel ratio and terminates when the air-fuel ratio detected by the upstream air-fuel ratio changes from lean to rich compared to the stoichiometric air-fuel ratio, and said rich gas outflow amount calculating means calculates said outflow amount of HC and CO based on the output of the downstream air-fuel ratio sensor during a rich gas outflow amount calculating period which starts when the air-fuel ratio detected by the upstream air-fuel ratio sensor changes from lean to rich compared to the stoichiometric air-fuel ratio and terminates when a predetermined time has elapsed after the air-fuel ratio detected by the upstream air-fuel ratio changed from rich to lean compared to the stoichiometric air-fuel ratio.

3. A device according to claim 2, wherein said rich gas inflow amount calculating means calculates said inflow amount of HC and CO by integrating the difference between the output of the upstream air-fuel ratio sensor and the output of the upstream air-fuel ratio sensor corresponding to the stoichiometric air-fuel ratio during said rich gas inflow amount calculating period, and said outflow rich gas calculating means calculates said outflow amount of HC and CO by integrating the difference between the output of the downstream air-fuel ratio sensor and the output of the downstream sensor at the beginning of said rich gas outflow amount calculating period during said rich gas outflow amount calculating period.

4. A device according to claim 1, wherein said air-fuel ratio feedback control means further controls the air-fuel ratio of the exhaust gas flowing into the catalytic converter so that the air-fuel ratio of the exhaust gas fluctuates around a center value on the lean air-fuel ratio side compared to the stoichiometric air-fuel ratio.

5. A device according to claim 4, wherein said rich gas inflow amount calculating means calculates said inflow amount of HC and CO based on the output of the upstream air-fuel ratio sensor during a rich gas inflow amount calculating period which starts when the air-fuel ratio detected by the upstream air-fuel ratio changes from lean to rich compared to the stoichiometric air-fuel ratio, and said rich gas outflow amount calculating means calculates said outflow amount of HC and CO based on the output of the downstream air-fuel ratio sensor during a rich gas outflow amount calculating period which starts when the air-fuel ratio detected by the upstream air-fuel ratio sensor changes from lean to rich compared to the stoichiometric air-fuel ratio and terminates when a predetermined time has elapsed after the air-fuel ratio detected by the upstream air-fuel ratio changes from rich to lean compared to the stoichiometric air-fuel ratio.

6. A device according to claim 4, further comprises saturation determining means for determining whether the catalytic converter has absorbed oxygen to its maximum $O_2$ storage capacity during the period in which the air-fuel ratio of the exhaust gas flowing into the catalytic converter is on a lean side compared to the stoichiometric air-fuel ratio and prohibiting means for prohibiting the determining means from determining the degree of deterioration of the catalytic converter when the saturation determining means determines that the catalytic converter has not absorbed oxygen to its maximum $O_2$ storage capacity.

7. A device according to claim 6, wherein said rich gas inflow amount calculating means calculates said inflow amount of HC and CO based on the output of the upstream air-fuel ratio sensor during a rich gas inflow amount calculating period which starts when the air-fuel ratio detected by the upstream air-fuel ratio changes from lean to rich compared to the stoichiometric air-fuel ratio and terminates when the air-fuel ratio detected by the upstream air-fuel ratio changes from lean to rich compared to the stoichiometric air-fuel ratio, and said rich gas outflow amount calculating means calculates said outflow amount of HC and CO based on the output of the downstream air-fuel ratio sensor during a rich gas outflow amount calculating period which starts when the air-fuel ratio detected by the upstream air-fuel ratio sensor changes from lean to rich compared to the stoichiometric air-fuel ratio and terminates when a predetermined time has elapsed after the air-fuel ratio detected by the upstream air-fuel ratio changed from rich to lean compared to the stoichiometric air-fuel ratio.

8. A device according to claim 7, wherein said saturation determining means determines whether the catalytic converter has absorbed oxygen to its maximum $O_2$ storage capacity based on the output of the upstream air-fuel ratio sensor during a saturation determining period which starts when the air-fuel ratio detected by the upstream air-fuel ratio sensor changes from rich to lean compared to the stoichiometric air-fuel ratio and terminates when the air-fuel ratio detected by the upstream air-fuel ratio sensor changes from lean to rich compared to the stoichiometric air-fuel ratio.

9. A device according to claim 6, wherein said saturation determining means determines whether the catalytic converter has absorbed oxygen to its maximum $O_2$ storage capacity based on the output of the upstream air-fuel ratio sensor during a saturation determining period which starts when the air-fuel ratio detected by the upstream air-fuel ratio sensor changes from rich to lean compared to the stoichiometric air-fuel ratio and terminates when the air-fuel ratio detected by the upstream air-fuel ratio sensor changes from lean to rich compared to the stoichiometric air-fuel ratio.

10. A device according to claim 9, wherein said saturation determining means integrates the difference between the output of the upstream air-fuel ratio sensor and the output of the upstream air-fuel ratio sensor corresponding to the stoichiometric air-fuel ratio during said saturation determining period, and determines that the catalytic converter has not absorbed oxygen to its maximum $O_2$ storage capacity when said integrated value becomes larger than a predetermined value.

* * * * *